(12) United States Patent
Mihailov et al.

(10) Patent No.: US 7,031,571 B2
(45) Date of Patent: Apr. 18, 2006

(54) BRAGG GRATING AND METHOD OF PRODUCING A BRAGG GRATING USING AN ULTRAFAST LASER

(75) Inventors: Stephen J. Mihailov, Kanata (CA); Dan Grobnic, Ottawa (CA); Christopher Smelser, Ottawa (CA); Robert Walker, Spencerville (CA); Ping Lu, Ottawa (CA); Huimin Ding, Nepean (CA); George Henderson, Ottawa (CA); Xiaoli Dai, Ottawa (CA)

(73) Assignee: Her Majesty the Queen in right of Canada, as represented by the Minister of Industry through the Communications Research Centre Canada, Ottawa (CA)

(*) Notice: Subject to any disclaimer, the term of this patent is extended or adjusted under 35 U.S.C. 154(b) by 0 days.

(21) Appl. No.: 10/803,890

(22) Filed: Mar. 19, 2004

(65) Prior Publication Data

US 2004/0184734 A1 Sep. 23, 2004

Related U.S. Application Data

(63) Continuation-in-part of application No. 10/639,486, filed on Aug. 13, 2003.

(60) Provisional application No. 60/456,184, filed on Mar. 21, 2003.

(30) Foreign Application Priority Data

Aug. 1, 2003 (CA) .................................. 2436499
Nov. 26, 2003 (EP) .................................. 03405845

(51) Int. Cl.
*G02B 6/34* (2006.01)

(52) U.S. Cl. ........................................ 385/37; 359/563

(58) Field of Classification Search .................. 385/37; 359/563

See application file for complete search history.

(56) References Cited

U.S. PATENT DOCUMENTS

4,807,950 A 2/1989 Glenn et al.

(Continued)

FOREIGN PATENT DOCUMENTS

EP 0 435 201 B 7/1991

(Continued)

OTHER PUBLICATIONS

K.M. Davis et al, "Writing waveguides in glass with a femtosecond laser", Opt. Lett., Nov. 1, 1996, vol. 21, No. 21, pp. 1729-1731.

(Continued)

*Primary Examiner*—Ellen E. Kim
(74) *Attorney, Agent, or Firm*—Neil Teitelbaum; Doug MacLean; Teitelbaum & MacLean

(57) ABSTRACT

A novel Bragg grating filter in optical waveguiding fiber with suppressed cladding mode coupling and method of producing same is disclosed. The novel grating structure is induced in both the core and the cladding of the optical fiber irrespective of the photosensitivity of the core or cladding to actinic radiation. Such core and cladding of the optical fiber need not be chemically doped to support the grating. The method incorporates an ultra short duration pulse laser source. Electromagnetic radiation provided from the laser propagates to a diffractive element positioned a specific distance to the target material such that the diffracted electromagnetic radiation forms a 2-beam interference pattern, the peaks of which are sufficiently intense to cause a change in index of refraction.

23 Claims, 15 Drawing Sheets

U.S. PATENT DOCUMENTS

| | | |
|---|---|---|
| 5,287,427 A | 2/1994 | Atkins et al. |
| 5,367,588 A | 11/1994 | Hill et al. |
| 5,495,548 A | 2/1996 | Bilodeau et al. |
| 5,620,496 A | 4/1997 | Erdogan et al. |
| 5,627,933 A | 5/1997 | Ito et al. |
| 5,730,888 A * | 3/1998 | Byron .................... 216/24 |
| 5,790,726 A | 8/1998 | Ito et al. |
| 5,978,538 A | 11/1999 | Miura et al. |
| 6,005,999 A | 12/1999 | Singh et al. |
| 6,009,222 A | 12/1999 | Dong et al. |
| 6,104,852 A | 8/2000 | Kashyap |
| 6,204,926 B1 | 3/2001 | Maznev et al. |
| 6,221,555 B1 | 4/2001 | Murakami et al. |
| 6,236,782 B1 | 5/2001 | Kewitsch et al. |
| 6,289,699 B1 | 9/2001 | Kewitsch et al. ............. 65/406 |
| 6,297,894 B1 | 10/2001 | Miller et al. |
| 6,347,171 B1 | 2/2002 | Tatah et al. .................. 385/37 |
| 6,351,588 B1 | 2/2002 | Bhatia et al. |
| 6,385,369 B1 | 5/2002 | Hill et al. |
| 6,465,153 B1 | 10/2002 | Kewitsch et al. |
| 6,516,118 B1 | 2/2003 | Brilland et al. |
| 6,578,388 B1 | 6/2003 | Kewitsch et al. |
| 6,628,877 B1 | 9/2003 | Dugan et al. |
| 6,633,419 B1 | 10/2003 | Hosono et al. |

FOREIGN PATENT DOCUMENTS

| | | |
|---|---|---|
| EP | 0 668 514 B | 8/1995 |
| EP | 1 291 985 A | 3/2003 |
| WO | WO 97/15851 A | 5/1997 |

OTHER PUBLICATIONS

Mihailov et al, "Fabrication of fiber bragg gratings (FBG) in all-Sio$_2$ and Ge-doped core fibers with 800 nm picosecond radiation" Optical Society of America, 2003.

Dyer et al, "Analysis of grating formation with excimer laser irradiated phase masks", Optics Comm. 115 (1995) vol. 115, pp 327-334.

Mills et al, "Imaging of free-space interference patterns used to manufacture fiber bragg gratings", Applied Optics, vol. 39, pp 6128-6135 (Nov. 2000).

* cited by examiner

BRAGG GRATING AND METHOD OF PRODUCING A BRAGG GRATING USING AN ULTRAFAST LASER

CROSS-REFERENCE TO RELATED APPLICATIONS

This application is a continuation-in-part of U.S. patent application Ser. No. 10/639,486 filed Aug. 13, 2003, which claims priority from U.S. provisional Application 60/456, 184 filed Mar. 21, 2003. This application also claims priority from U.S. Provisional Application No. 60/545,949 filed Feb. 20, 2004, Canadian application 2,436,499 filed Aug. 1, 2003, and European Application 03405845.3 filed Nov. 26, 2003, which are all incorporated herein by reference.

FIELD OF THE INVENTION

This invention relates generally to the direct writing of gratings in light transmissive or light absorbing optical media such as optical fiber and waveguides using a diffraction grating and femtosecond pulsed light; and, one aspect of this invention relates to a method of suppression of cladding modes in optical fiber or waveguides with gratings therein.

BACKGROUND OF THE INVENTION

The fabrication of many photonic devices has been achieved through exposure of transmissive and absorbing materials to intense laser radiation in order to change the optical properties of said materials. For example, UV-induced photosensitivity of germanium doped silica glasses has been exploited in order to create permanent refractive index changes in the photosensitive Ge-doped silica cores of single mode optical fibers and waveguides as opposed to the undoped cladding. By creating a spatial intensity modulation of the UV exposure either by using a two-beam interference technique as disclosed in U.S. Pat. No. 4,807,950 by Glenn et al. or by using a phase mask as disclosed in U.S. Pat. No. 5,367,588 by Hill et al., Bragg grating structures can be produced in the photosensitive core of the waveguide.

Bragg gratings in optical fiber and waveguides have developed into an important technology for wavelength division multiplexing (WDM) systems and other applications for fiber optic systems such as optical sensing because of the highly desirable optical characteristics the Bragg structures exhibit as well as the relative ease with which they can be fabricated. A large variety of optical devices have been fabricated using Bragg gratings in waveguides including optical add/drop multiplexing filters (OADM), gain flattening filters, band splitters and dispersion compensators.

As disclosed by Glenn et al., permanent periodic gratings are provided or impressed into the core of an optical fiber by exposing the core through the cladding to the interference fringe pattern generated by two coherent beams of ultraviolet laser light that are directed against the optical fiber symmetrically to a plane normal to the fiber axis. The material in the fiber core is exposed to the resultant interference fringe intensity pattern created by the two overlapping UV beams creating permanent periodic variations in the refractive index along the length of the UV photosensitive core of the waveguide. The resultant refractive index variations are oriented normal to the waveguide axis so as to form the Bragg grating.

A more popular method of photo imprinting Bragg gratings is taught by Hill et al. in U.S. Pat. No. 5,367,588 where an interference fringe pattern is generated by impinging a single UV light beam onto a transmissive diffractive optic known as a phase mask. The waveguide to be processed is placed immediately behind the phase mask and is exposed to the generated interference fringe pattern leading to the formation of the Bragg grating structure. In these prior art examples, optical fibers or waveguides having a Ge doped photosensitive core are irradiated with UV light at a predetermined intensity and for a predetermined duration of time sufficient to obtain a substantially permanent Bragg grating structure within the core of said waveguide.

These prior art gratings provide a useful function, however they are known to suffer from some limitations in terms of the out-of-band loss that results from coupling of the fundamental core mode $LP_{01}$ into backward-propagating lossy cladding modes. For example, a single mode optical fiber with a UV-photosensitive core and non UV-photosensitive cladding, will develop a Bragg grating structure using the techniques disclosed by Glenn et al. and Hill et al. only in the core region of the fiber. The fiber Bragg grating will reflect light in a narrow band centered on the Bragg resonance wavelength, $\lambda_{Bragg}$, determined by the well-known Bragg's diffraction condition $$m\lambda_{Bragg} = 2n_{eff}\Lambda \qquad (1)$$

where $n_{eff}$ is the effective refractive index seen by the fundamental $LP_{01}$ core mode, $\Lambda$ is the period of the grating and m is the order number. Re-expressing equation (1) in terms of the propagation constant of the fundamental mode $\beta_{01} = 2\pi n_{eff}/\lambda_{Bragg}$ yields the phase matching condition $$2\beta_{01} = \frac{2\pi m}{\Lambda} \qquad (2)$$

Because the refractive index modulated grating is localized to the core region only, but the mode field of the $LP_{01}$ extends into the unmodulated cladding region, some coupling of the energy into cladding modes occurs due to a non-zero weighted overlap integral between the guided $LP_{01}$ mode and the cladding modes. For optical fiber waveguides that comprise a core, a cladding surrounding the core and then air or a protective coating surrounding the cladding, several propagation modes can be supported in the cladding region. These modes may be guided or lossy depending on whether the outer layer surrounding the cladding has a lower or a higher refractive index than the cladding. These modes are commonly referred to as $LP_{\mu\nu}$ cladding modes where $\mu\nu$ is the mode number. If the phase matching condition $$\beta_{01}(\lambda_{\mu\nu}) + \beta_{\mu\nu}(\lambda_{\mu\nu}) = 2\pi/\Lambda \qquad (3)$$

is satisfied, light propagating in the $LP_{01}$ mode may couple into cladding mode $LP_{\mu\nu}$, where $\beta_{\mu\nu} = 2\pi n_{\mu\nu}/\lambda_{\mu\nu}$ is the propagation constant of cladding mode $LP_{\mu\nu}$ at wavelength $\lambda_{\mu\nu}$, $n_{\mu\nu}$ is the modal refractive index of the cladding and $\beta_{01} = 2\pi n_{eff}/\lambda_{\mu\nu}$ is the propagation constant of the fundamental mode $LP_{01}$ at wavelength $\lambda_{\mu\nu}$. Since $n_{\mu\nu}$ is always less than $n_{eff}$ for a single mode optical waveguide, the wavelength $\lambda_{\mu\nu}$ at which the phase matching condition in equation (3) is satisfied will always be less than the Bragg resonance wavelength $\lambda_{Bragg}$.

Usually there are a series of wavelengths that meet this condition, corresponding to a series of cladding modes. Power that is coupled into the cladding modes is not entirely guided hence it is lost through absorption or scattering through the fiber coating.

The strength of coupling between the $LP_{01}$ mode and the various cladding modes $LP_{\mu\nu}$, caused by the grating can be measured by a coupling coefficient, containing an overlap integral performed over the cross section of the fiber as discussed by Erdogan in "*Fiber Grating Spectra*" *J. Lightwave. Tech.* 15 (8), p. 1277–1294 (1997)

$$\kappa_{01,\mu v} = \frac{\omega}{4} \int_A \int_\infty dx\, dy\, E_{01}(x,y) E_{\mu v}(x,y) \Delta n_f(x,y) \quad (4)$$

where $\kappa_{01,\mu v}$ is the coupling coefficient between the guided $LP_{01}$ mode and a cladding mode $LP_{\mu v}$. $A\infty$, $\omega$, $E_{01}(x,y)$, $E_{\mu v}(x,y)$ and $\Delta n_f$ are the fiber cross section, angular optical frequency, guided mode field, cladding mode field and photosensitivity profile respectively. The integral in equation (3) is nulled, ie $\kappa_{01,\mu v}=0$, if $\Delta n_f$ is constant over the area where the guided $LP_{01}$ mode field is confined. This is usually not the case in standard photosensitive core fibers since the cladding is far less photosensitive.

In a method disclosed by E. Delevaque et al, *Conference on Fiber Communication, Technical Digest Series*, Vol 8, No. 6, pp 343–346 (1995), the cladding is rendered photosensitive as well as the core, so that the refractive index grating is recorded in both the core and, to an extent, in the cladding. When a UV-induced index grating is written into the core and the intermediate cladding region, suppression of cladding modes results.

There are several examples of prior art where different fiber designs and fiber chemistries are employed to render the cladding photosensitive to UV light, as disclosed in U.S. Pat. Nos. 5,627,933 and 5,790,726 by Ito et al., U.S. Pat. No. 6,005,999 by Singh et al., U.S. Pat. No. 6,009,222 by Dong et al., U.S. Pat. No. 6,221,555 by Murakami et al. and U.S. Pat. No. 6,351,588 by Bhatia et al. These prior art fiber designs provide a useful function however they suffer from some limitations. Often the complicated fiber chemistry results in a fiber that possesses many internal stresses, which makes the fiber more fragile. Mode fields of the guided $LP_{01}$ are not identically matched to standard Ge-doped telecom fiber (for example SMF-28 from Corning Inc.) hence high splice losses result. The fiber is often more expensive to produce.

These prior art gratings produced in these UV-photosensitive cladding fibers often suffer from some limitations in terms of the amount of induced index change that is possible. In order for high refractive index modulated Bragg grating structures to be written in these optical fibers, the optical fiber often needs to be photosensitized to UV light by exposing such an optical fiber to hydrogen or deuterium gas at elevated pressures and temperatures as taught by Atkins et al. in U.S. Pat. No. 5,287,427 or by hydrogen flame brushing as taught be Bilodeau et al. in U.S. Pat. No. 5,495,548. After exposure, it is preferable to subject the UV written structures to annealing at elevated temperatures in order to remove any remaining interstitial hydrogen or deuterium present in the waveguide core. As taught by Erdogan et al. in U.S. Pat. No. 5,620,496, this annealing step is often implemented in order to stabilize by accelerated aging, the induced index change. These extra processing steps to the optical fiber or waveguide complicate the manufacturing of photonic devices and reduce yield.

Recently processes that employ high-intensity laser pulses in the femtosecond pulse duration regime for creating permanent changes in the refractive indices of glasses have been explored by several groups of researchers. K. M. Davis et al. disclose a technique for inducing index change in bulk glasses with ultra-high peak power femtosecond infra-red radiation in Opt. Lett. 21, 1729 (1996), incorporated herein by reference. The physical process that appears to cause the refractive index change in the materials need not be due to the dopant dependant mechanisms occurring with UV-induced index change, namely color center formation. Instead the refractive index change is due to the creation of free electrons through non-linear absorption and multi-photon ionization of bound charges, followed by avalanche ionization and localized dielectric breakdown as these free electrons are accelerated by the intense but short time duration laser field. Also, this leads to a localized melting and restructuring of the material and a concurrent increase in the index of refraction. The creation of waveguides in bulk glasses using this technique is taught by Miura et al. in U.S. Pat. No. 5,978,538 while the modification or trimming of existing waveguide structures is taught by Dugan et al. in U.S. Pat. No. 6,628,877; both of these references are incorporated herein by reference.

In order to photo imprint retroreflective Bragg structures into the core of optical fibers or waveguides using high-intensity femtosecond time duration radiation, it is advantageous to generate an interference fringe pattern originating from a single femtosecond laser pulse either using a holographic technique or a diffractive optic. Hosono et al. in U.S. Pat. No. 6,633,419 incorporated herein by reference disclose an apparatus for producing a hologram using a two-beam laser interference exposure process, comprising the steps of using a femtosecond laser having a pulse width of 10 to 900 femtoseconds and a peak output of 1 GW or more that is capable of generating a pulse beam at or close to the Fourier transform limit. The beam from the laser is divided into two beams using a beam splitter, controlled temporally through an optical delay circuit and spatially using plane and concave mirrors each having a slightly rotatable reflection surface to converge the beams on a surface of or within a substrate for recording a hologram at an energy density of 100 GW/cm$^2$ or more with keeping each polarization plane of the two beams in parallel so as to match the converged spot of the two beams temporally and spatially, whereby a hologram is recorded irreversibly on the substrate formed of a transparent material, semiconductor material or metallic material. The volume hologram is optionally layered so as to provide a multiplex hologram recording that is permanent unless it is heated to a temperature to cause the structural change in the atomic arrangement of the substrate in which the hologram is inscribed.

Miller et al., in U.S. Pat. No. 6,297,894 incorporated herein by reference, teach a method for utilizing a diffractive optic to generate an interference fringe pattern in order to induce refractive index changes in materials using femtosecond time duration laser radiation. An exemplary embodiment of the invention of Miller et al. comprises a femtosecond laser source for providing light to a diffractive optical element. Light propagating from the diffractive optical element is incident on a curved mirror, which acts to focus the light into a lens or another curved mirror and then into a target.

Mihailov et al. in U.S. patent application Ser. No. 10/639,486, from which this application claims priority, disclose a technique for fabrication of Bragg grating structures in optical media such as optical fibers and waveguides with an ultrafast (<500 ps) laser source and a zero-order nulled phase mask using a direct writing technique. The resultant grating structures have high induced-index modulations (>1×10$^{-3}$) which were achieved without any special fiber sensitization process such as those taught be Atkins et al. in U.S. Pat. No. 5,287,427. Since the refractive index change need not be dependent on the dopant in the core or cladding of the waveguide, refractive index changes can be induced in both regions of the waveguide.

It is an object of this invention to overcome the aforementioned limitations within the prior art systems for fabrication of cladding mode suppressed Bragg gratings in optical fiber and waveguides by inducing refractive index change in optical fibers and waveguides using femtosecond time duration laser radiation. Additionally, it would be beneficial to provide a simple method of producing high quality fiber Bragg gratings (FBGs) that are robust, do not require specialty optical fiber and are not subject to photosensitization techniques or annealing.

It is a further object of this invention to provide a method of writing a grating in the cladding of a standard optical fiber that has not been photosensitized and that is not necessarily sensitive to actinic radiation.

SUMMARY OF THE INVENTION

A method for inducing a spatially modulated refractive index pattern in an at least partially light transmissive or absorbing material, comprising the steps of:
providing the at least partially light transmissive or absorbing material;
disposing a mask to be used as an interferometer, adjacent the partially light transmissive material such that light incident upon the mask is transmitted directly into said material; and,
providing electromagnetic radiation on a surface of the mask, the electromagnetic radiation having a predetermined wavelength range and having a pulse duration of less than or equal to 500 picoseconds, wherein the mask is disposed to permit a portion of the electromagnetic radiation to interact with the mask and be incident on the at least partially light transmissive or absorbing material, the interaction of the electromagnetic radiation with the mask for producing a spatial intensity modulation pattern within the least partially light transmissive or absorbing material, the electromagnetic radiation incident on the least partially light transmissive or absorbing material being sufficiently intense to cause a change in an index of refraction of the at least partially light transmissive or absorbing material, wherein magnetic radiation interacting with the surface of the mask having a sufficiently low intensity to not significantly alter produced spatial intensity modulation properties of the mask.

In accordance with another aspect of the invention, there is provided a method of inducing a spatially modulated refractive index pattern in a cladding of an optical waveguide, comprising the steps of:
providing the an optical waveguide having a cladding and a core;
disposing a mask to be used as an interferometer, adjacent the cladding such that light incident upon the mask is transmitted directly into said cladding; and,
providing electromagnetic radiation on a surface of the mask, the electromagnetic radiation having a predetermined wavelength range and having a pulse duration of less than or equal to 500 picoseconds, wherein the mask is disposed to permit a portion of the electromagnetic radiation to interact with the mask and be incident on the cladding, the interaction of the electromagnetic radiation with the mask for producing a spatial intensity modulation pattern within the cladding, the electromagnetic radiation incident on the cladding being sufficiently intense to cause a change in an index of refraction of the cladding, the electromagnetic radiation interacting with the surface of the mask having a sufficiently low intensity to not significantly alter produced spatial intensity modulation properties of the mask.

In accordance with another aspect of the invention, there is provided method for inducing a spatially modulated refractive index pattern in at least a partially transmissive material, comprising the steps of:
providing the at least partially transmissive material;
disposing and orienting a mask adjacent to the at least partially transmissive material at a distance "d" such that group velocity walk-off results in pure 2-beam interference within the at least partially transmissive material when irradiated with a pulse of light of less than or equal to 100 picoseconds, wherein the distance "d" is chosen such that the difference in times of arrival of the order pairs due to group velocity walk-off results in-the pure 2-beam interference pattern of subbeams of said pulse of light that have passed through or reflected off of the mask; and,
irradiating the mask with pulsed light having a duration of 100 ps or less to generate the index modulated pattern in the at least partially light transmissive material.

In all aspects of the invention, a mask or diffraction grating is placed near the object in which the modulation pattern is to be written and a direct writing technique is used wherein the mask or grating is irradiated with pulsed light having a pulse duration of 100 picoseconds or less.

In accordance with another aspect of the invention, there is provide an optical waveguide grating comprising:
a core having a refractive index $n_1$;
a cladding provided around an outer periphery of said core, said cladding having a refractive index n2 different than the refractive index n1 of said core, wherein the cladding is not substantially photosensitive to actinic radiation (UV); and,
a grating written in the cladding.

Within this specification, direct writing is defined as positioning of the target material with reference to the mask such that the mask is used an interferometer and the interference field produced by the mask impinges on the target. This distinguishes from systems where the diffractive element is used to produce multiple beams which are being redirected and further processed.

Although in a preferred embodiment the mask is a phase mask it can be a diffractive optic element, an amplitude mask or a reflection diffraction grating.

BRIEF DESCRIPTION OF THE DRAWINGS

The invention is now described with reference to the drawings in which.

DETAILED DESCRIPTION OF THE INVENTION

Figure 1:
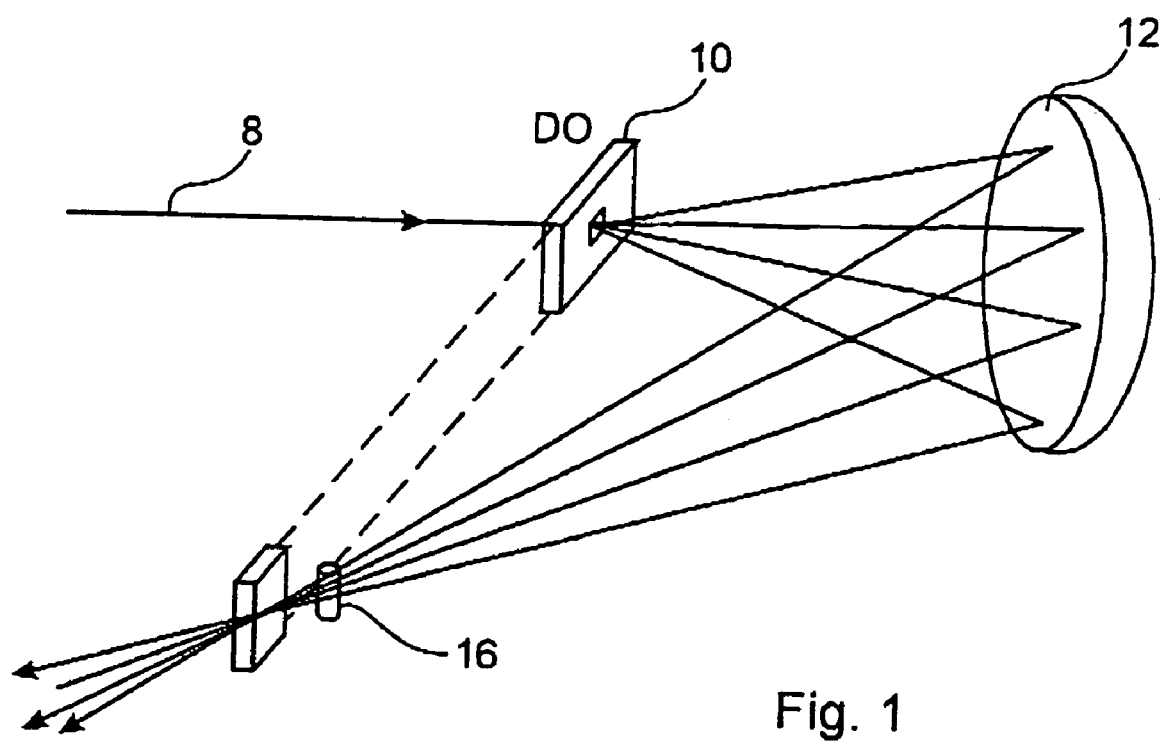
FIG. 1 is a prior art system for holographic imaging.

Referring to FIG. 1, the prior art of Miller et al. is shown. A femtosecond laser pulse 8 is incident on a diffractive element 10. The laser pulse 8 is diffracted and propagates to a curved mirror 12. The laser pulse is reflected and propagates into a lens 16. The laser pulse then propagates from the lens to the target.

Unfortunately, the technique taught by Miller et al. is very sensitive to the alignment of the various optical components. This technique is an interferometric technique, which incorporates a diffractive optic to split a beam to produce a plurality of beams. The optical path lengths of the diffracted beams should be the same length within a tolerance corresponding to the physical presence of the electromagnetic radiation i.e. approximately 30 µm for 125 femtosecond laser pulses. Although not impossible, it is often difficult to provide such highly accurate path lengths, even with costly equipment. Consequently, when such a technique is used to produce a Bragg grating in an optical fiber even a small misalignment in any of the optical components almost certainly results in a poor grating. Indeed, the "pulse-to-pulse" stability of the optical system as taught by Miller et al. should be very consistent or the fringe contrast produced by the overlapping beams is "washed out". Indeed, small vibrations and air currents are sufficient to reduce the "pulse to pulse" stability in an optical system as taught by Miller et al. Additionally, the filtering characteristics such as apodization, chirp, and phase-shifts are difficult to image remotely. Therefore, it would be difficult to incorporate the teachings of Miller et al. in a system for producing Bragg grating structures in optical fiber.

As a person of skill in the art will be aware, the relatively short duration of a femtosecond laser pulse provides a laser pulse that is not monochromatic. Additionally, a person of skill in the art will be aware that a diffractive element, such as a phase mask, angularly deflects light according to the wavelength of the light. In U.S. Pat. No. 6,297,894 issued to Miller et al. beginning at column 2 line 49, states that, "Providing a hybrid technique of utilizing standard phase masking techniques in combination with using ultra short high power femto-second pulses is problematic, since close coupling a phase mask to create an interferometric pattern in a sample is not feasible; the mask will experience optical damage due to the high peak intensity of light required at the sample position. Hence . . . the mask must be located remotely . . . ". Embodiments of the invention presented hereinbelow demonstrate that the reasoning of Miller et al. need not be the case. Further, the prior art of Miller et al. states that remotely locating the phase mask will protect it from optical damage but will not produce interference fringes because of the dispersive spreading of the high spectral content ultra short laser pulse. Ultra short duration pulses of light having long wavelengths are known to have very high intensity and consequently it was reasoned that this type of pulse would damage a phase mask positioned in close proximity to a target of such a pulse.

Figure 1A:
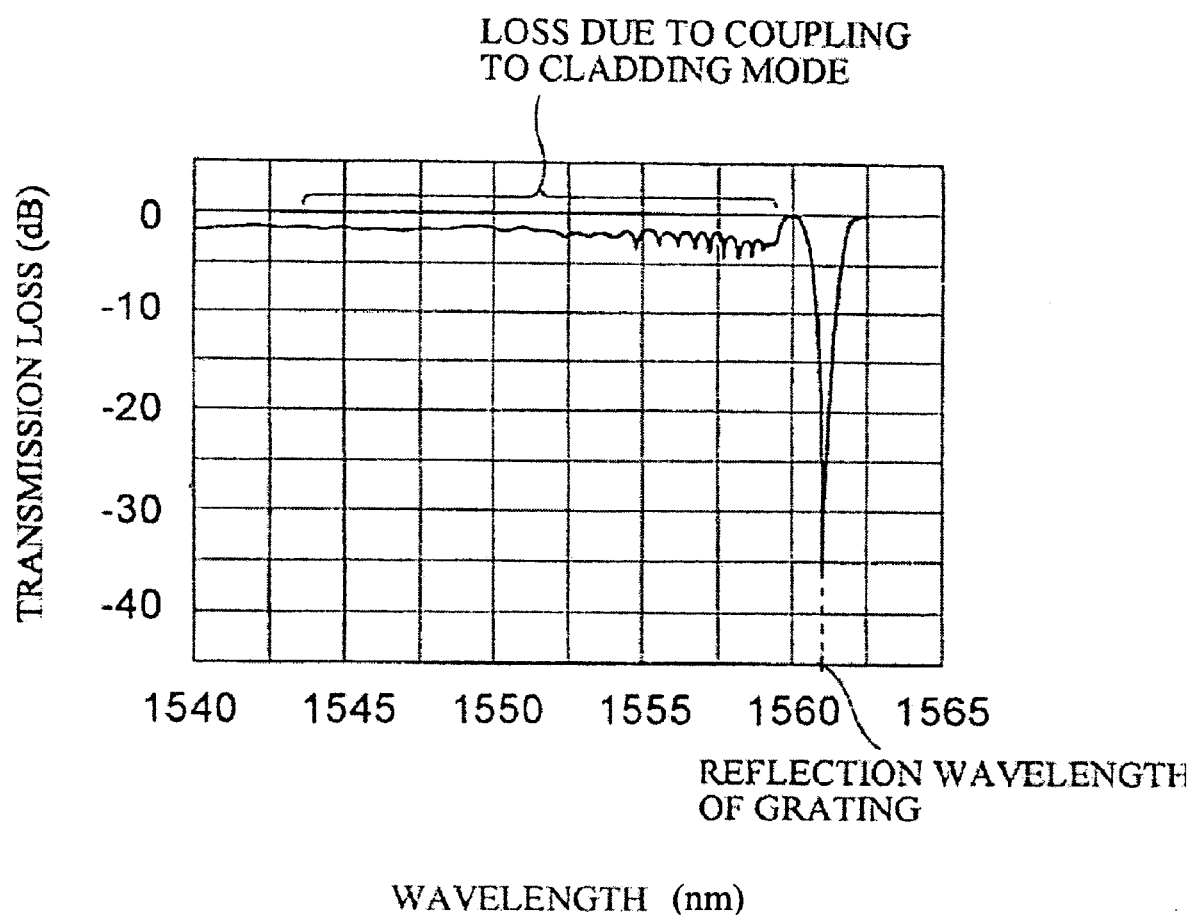
FIG. 1a is a transmission spectrum of a Bragg grating device UV-inscribed in standard single mode telecom fiber that suffers from cladding mode coupling loss.

Referring to FIG. 1a, the transmission spectrum of a fiber Bragg grating written in standard telecom fiber with a UV-source is presented. Note the coupling to cladding modes that is visible on the short wavelength of the reflection wavelength of the grating.

Figure 1B:
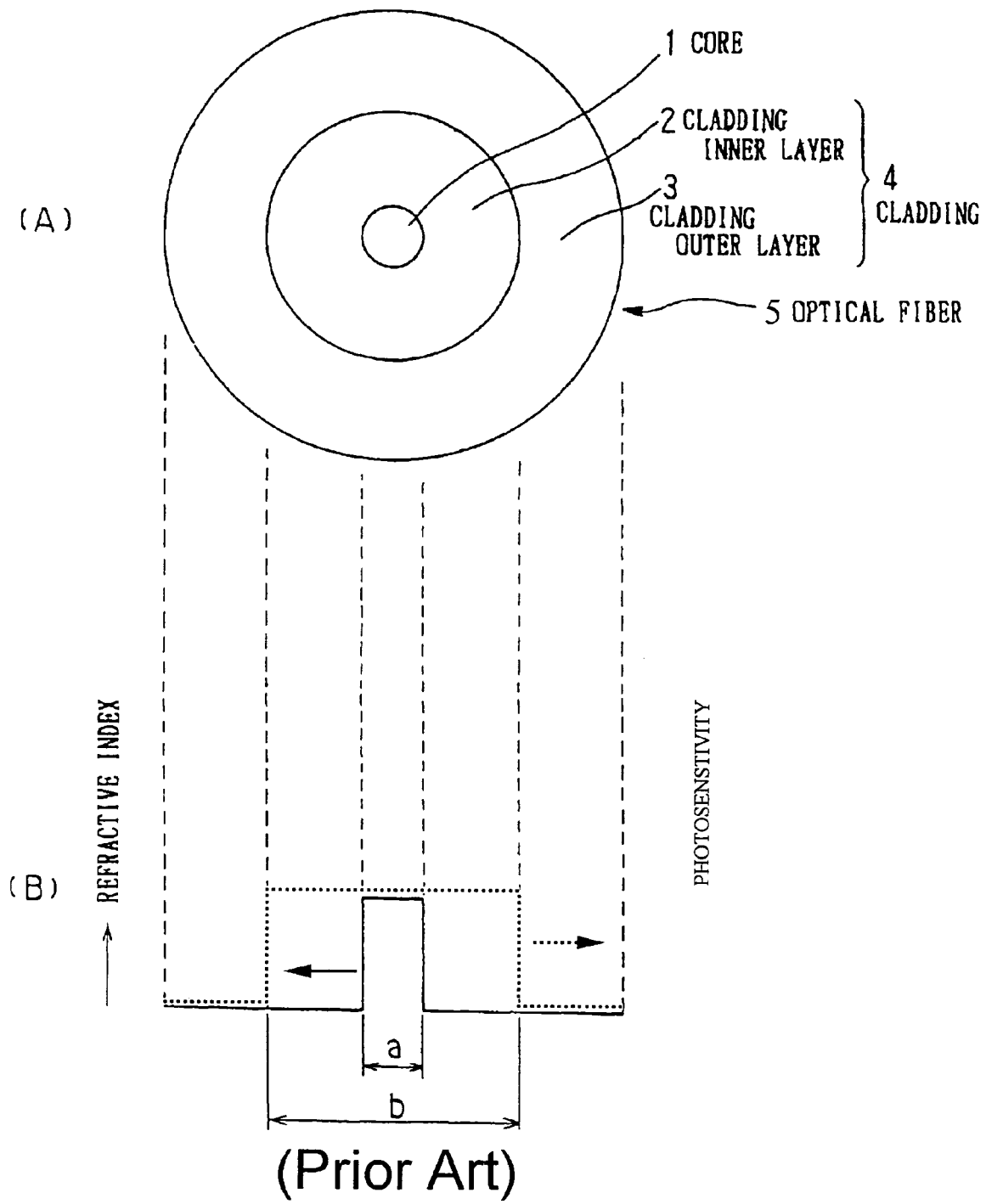
FIG. 1b is a prior art system of single mode optical fiber which possesses a UV-photosensitive core and inner cladding region.

Referring to FIG. 1b, the prior art of Ito et al, Singh et al, and Murakami et al is shown. Optical fiber gratings were UV-induced using the techniques of Glenn et al or Hill et al. in the photosensitive fiber described in FIGS. 1bA and 1bB. Doping $SiO_2$ with a photosensitive dopant $GeO_2$ for increasing the refractive index forms a core 1 of an optical fiber 5. The addition of $GeO_2$ dopant also increases the photosensitivity of the core 1 with respect to the outer cladding 3. In order to achieve a good suppression of the cladding mode coupling, Bhatia et al. teach in U.S. Pat. No. 6,351,588 that matching of the photosensitivity of the inner cladding and core must be closely matched, hence the inner cladding layer 2 must have the same photosensitivity as the core 1. The different prior art examples teach how different fiber chemistries, different dopants added to the core, inner and outer cladding regions can achieve the single mode refractive index profile and the photosensitivity core-cladding profile in order to suppress cladding mode coupling when a UV-induced grating is inscribed in the fiber.

Unfortunately, the special fiber designs taught by Ito et al, Singh et al, Murakami et al and Bhatia et al. are complex processes which often produce fibers which are expensive compared to standard single mode telecom fiber, and may suffer from modal field differences or internal stresses that make them difficult to splice to existing fiber networks without incurring a high splice loss penalty. Gratings that are often fabricated in this fiber require high index changes therefore it is often necessary to photosensitize the fiber by the techniques taught by Atkins et al. or Bilodeau et al. and subsequently anneal the fiber grating devices by the techniques taught by Erdogan et al. What would be preferable is a technique for fabrication of high index modulated gratings directly in the core and cladding regions of standard telecom fiber such as SMF-28 without using special fiber designs or photosensitization techniques.

Mihailov et al. in U.S. patent application Ser. No. 10/639, 486 disclose a technique for fabrication of Bragg grating structures in fibers and waveguides with an ultrafast (<500 ps) laser source and a zero-order nulled phase mask, thereby not requiring photosensitive optical fiber sensitive to actinic radiation for imprinting a grating therein. Actinic radiation is electromagnetic radiation that can produce photochemical reactions in photosensitive treated or doped optical fibers. The structures of Mihailov et al. have high induced-index modulations ($>1\times10^{-3}$) that were achieved without any special fiber sensitization. Mihailov et al. also disclosed in a paper entitled "*Fabrication of fiber Bragg gratings (FBG) in all-SiO$_2$ and Ge-doped core fibers with 800 nm picosecond radiation*" *TuB2 or the Proceedings of the Topical Meeting on Bragg Gratings Photosensitivity and Poling in Glass waveguides*, that induced index modulations could be generated in both the core and cladding region of Ge-doped and all-silica core fibers. Since the refractive index change is not dependent on the dopant in the core or cladding of the waveguide, refractive index changes can be induced in both regions of the waveguide. It is disclosed here that by controlling the exposure location and number of interfering beams produced by the phase mask that generate the interference pattern, pure 2-beam interference patterns were created in the core and extended into the cladding region immediately surrounding the core in standard Ge-doped step-index single mode telecom fiber without the necessity of hydrogen loading and annealing.

Figure 2:
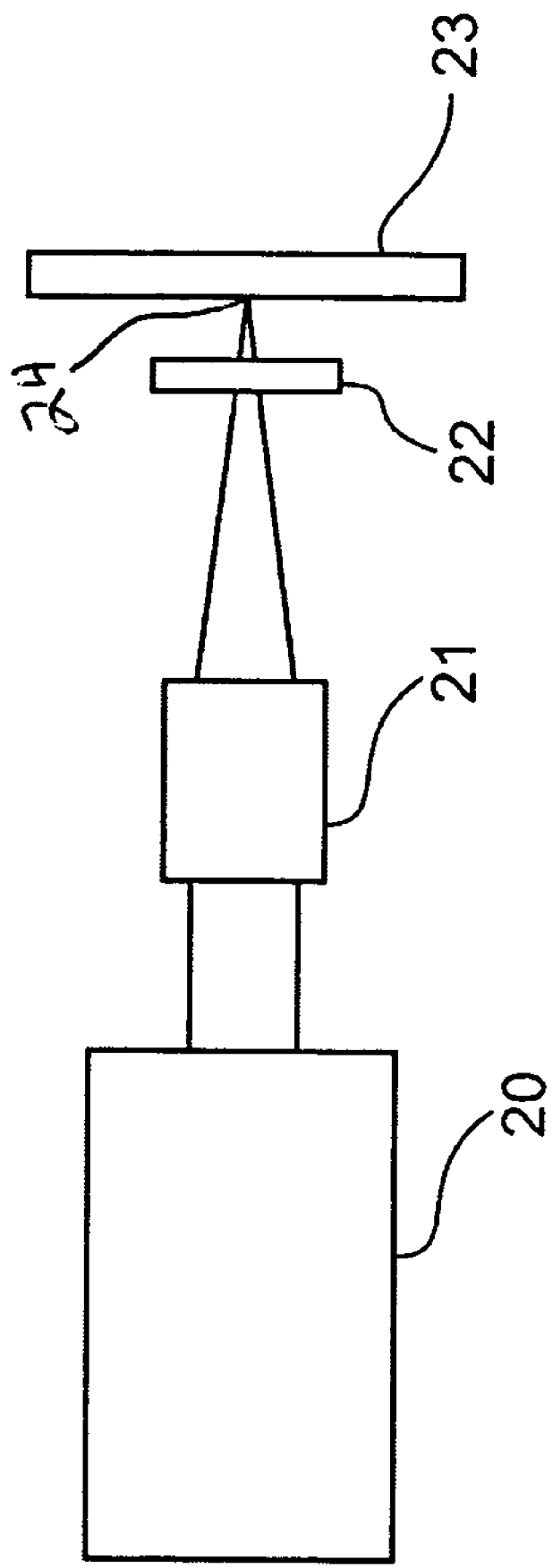
FIG. 2 is a diagram of a system according to an embodiment of the invention.

Referring to FIG. 2, a simplified diagram of an apparatus for producing fiber Bragg gratings (FBGs) according to an embodiment of the invention is shown. The apparatus comprises: a laser source 20 for providing ultra-short duration pulses of laser light; a cylindrical lens 21 for focusing the ultra-short duration pulses at a target 24; a diffractive optical element 22; and, an optical waveguide 23 having a target portion 24. In use, the optical waveguide 23 is biased against a fixture and the target portion 24 of the optical waveguide 23 is stripped of any external jacket. The diffractive optical element 22 is positioned adjacent to and aligned with the target portion 24. When the laser source 20 is activated it emits an ultra-short duration pulse of laser light. The ultra-short duration pulse propagates from the laser source 20 and is directed to pass through the cylindrical lens 21. The ultra-short duration pulse then propagates from the cylindrical lens 21 to the diffractive element 22. The diffracted ultra-short duration pulse of laser light then propagates into the optical fiber wherein an interference fringe pattern is generated. The intensity peaks of the interference fringe pattern are spatially oriented along a length of the optical fiber to cause periodic index changes within the fiber at predetermined intervals, thus forming a Bragg grating therein. Although this embodiment of the invention relies upon a cylindrical lens 21 for focusing the ultra-short duration pulses of light this need not be the case. In an alternative embodiment of the invention, means for providing optical power in the form of a focusing mirror is used to focus the ultra-short duration pulses of light instead of the cylindrical lens 21. Although this invention is particularly suited to writing gratings, such as Bragg gratings in the core or cladding of standard telecom optical fiber without the requirement of photosensitizing the waveguide or fiber, it is also suited to photoresist patterning in optical material and to direct patterning of glasses, semiconductor materials, non-linear crystalline materials such as, LiNbO$_3$. Such surface and volume holograms are optionally used for optical encoding and data storage. Similarly taps can be generated by writing Bragg gratings at an angle in the form of a blazed grating as described by Hill et al in U.S. Pat. No. 6,385,369. The invention as described in reference to FIG. 2 improves on remote imprinting of interference fringes generated by a phase mask by using peak powers that are below the damage threshold of the phase mask and; below the threshold of supercontinuum generation that has been correlated with nonlinear self-focusing processes, which lead to damage. The intensity levels incident on the fiber waveguide that are required to create photoinduced index changes in Ge-doped fibers are not as high as previously thought as there seems to be preferential multi-photon absorption in the Ge-doped region as opposed to the undoped cladding. It is unclear if the preferential multiphotonic absorption in the core is due to the presence of the Ge dopant or is more generally due to a multiphotonic self-focusing process that is accentuated as a result of the step index change at the circular core cladding interface that is a lensing effect of the core. Embodiments of the invention featuring a silica phase mask permit the placement of the silica phase mask in close proximity to the target waveguide without damaging the silica phase mask, when laser intensities below the damage threshold of the silica are used. Thus, in an embodiment of the invention, the diffractive element is a silica phase mask. Indeed, the phase mask is optionally made of any material that is transmissive to the range of wavelengths of the ultra short duration pulse of laser light. Suitable materials include BK7 glass, soda lime glass, plastic, and UV transmissive glasses such as silica, calcium fluoride, and magnesium fluoride. Alternative embodiments of the invention feature a phase mask that is not transmissive to the incident ultra short duration pulse of laser light. For example, the phase mask is optionally a frequency-doubling medium like a crystal with an antireflection coating in the infra red so that visible light from an ultra short duration pulse is generated in the phase mask and the generated light diffracted but the IR light is reflected.

In the embodiment of the invention shown in FIG. 2, the alignment of the various components is very important to ensure that a good quality Bragg grating is produced, however the process of aligning the components is relatively simple in comparison with the prior art of Miller et al. Specifically, the fiber is positioned near a predetermined position relative to a focusing point of the laser source 20 and cylindrical lens 21 combination. The diffractive element is positioned within the optical path of a laser pulse and at a predetermined distance from the optical fiber. The impact of the adversity of the angular dispersion of the diffracted beams as taught by Miller et al. is greatly reduced by disposing the silica glass phase grating mask adjacent and parallel to an optical medium. Since the beam intensity is also below the damage threshold of the phase mask, the mask need not be placed and aligned remotely as taught by Miller.

Although this invention relates broadly to writing index changes in optical media by using a diffractive element such as a phase mask, by direct writing techniques, unlike Miller's indirect remote techniques, it is been found to be particularly useful for use in writing gratings in the cladding of a standard unphotosensitized optical fiber. This is very useful in creating gratings with cladding mode suppression.

In order to obtain good cladding mode suppression it is important that the index change across the cross section of the fiber be uniform, and that the index modulation be continuous across the core-cladding interface. As taught by Dyer et al. in "Analysis of grating formation with excimer-laser irradiated phase masks", Optics Communications, Vol. 115, pg. 327–334 (1995), when multiple beam interference occurs the resulting field pattern generated by the phase mask becomes complex. Mills et al. disclose in "Imaging of free-space interference pattern used to manufacture fiber Bragg gratings", Applied Optics, Vol. 39, pg. 6128–6135 (2000) measurements of the field generated by a phase mask.

For a phase mask with a poor zero order, that multiple beam interference of the 0 and ±1 orders generated by the phase mask produce sinusoidal fringe patterns at a distance from the phase mask known as the Talbot pitch. At the distance corresponding to half the Talbot pitch another set of sinusoidal fringe patterns is generated that are 180 degrees out of phase with the pattern at the Talbot pitch. In order to produce a continuous index modulation across the core and cladding region this phase shift in the generated grating planes is undesirable and should be avoided.

Figure 3A:
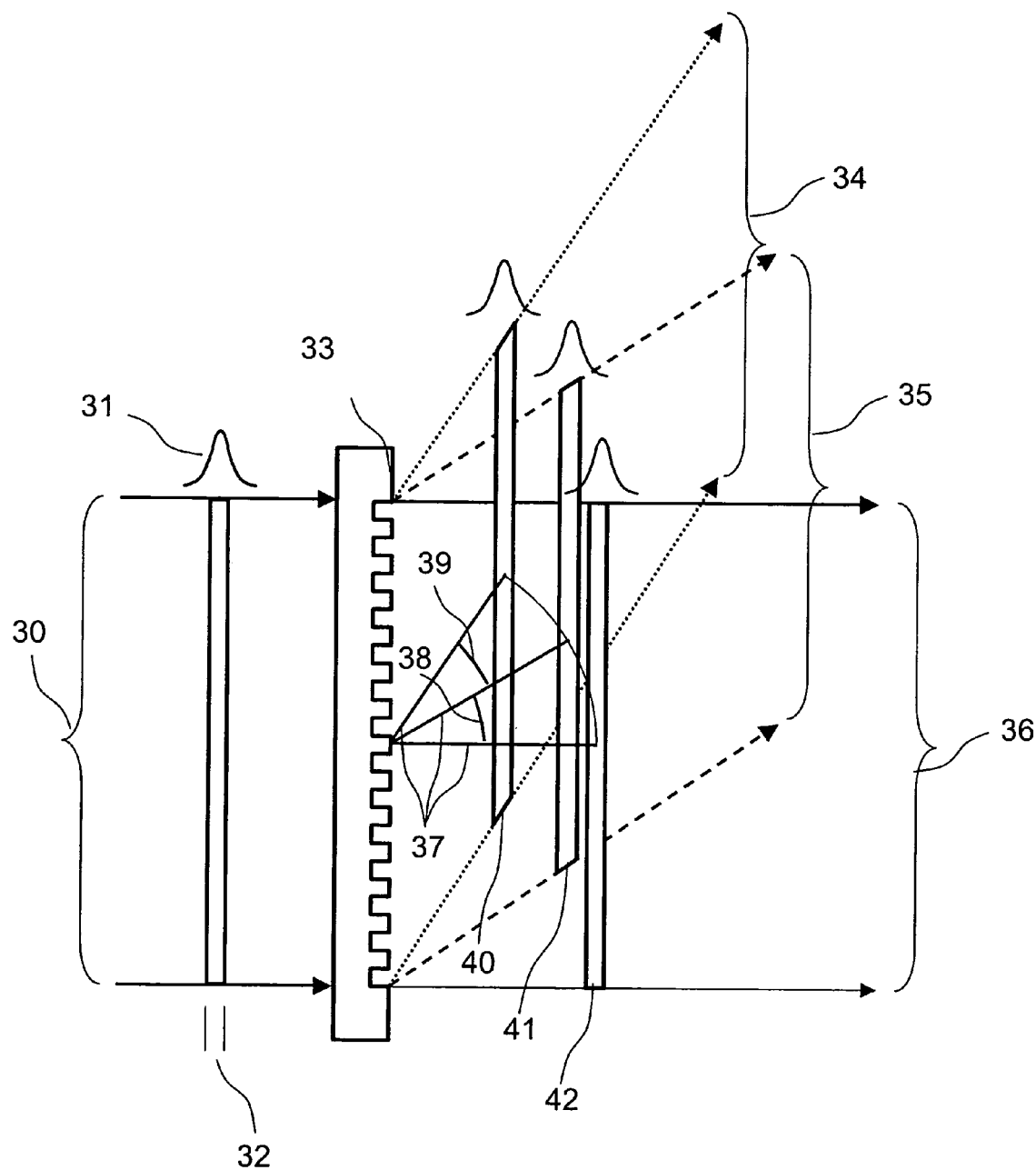
FIG. 3a is a representative view of the time of arrival at a given distance from the phase mask of the fs duration pulse envelopes in each of the 0, +1 and +2 orders.

In accordance with this invention, a more practical approach to writing a grating in the core and the cladding is to utilize the self-aligning nature of the phase mask to match the path lengths. Referring now to FIG. 3a, the femtosecond beam 30 is normally incident on the phase mask 33. The pulse envelope 31 of the beam is quasi-Gaussian. The 1/e spatial width 32 of the pulse envelope for example for a 120 fs pulse would be 36 μm. When the pulse 31 propagates through the phase mask, the pulse is split and diffracted into various orders (0, ±1, ±2 etc.). For clarity only the 0 order (36), +1 order (35), and +2 order (34) paths are shown. For a given time, the zero order pulse 42 will propagate a distance D (37) from the phase mask. The +1 order pulse 41 will propagate a distance D (37) along the first order beam path 35 which is at an angle 38 with respect to zero order beam path 36. Similarly the +2 order pulse 40 will propagate a distance D (37) along the first order beam path 34 which is at an angle 39 with respect to zero order beam path 36. The angles 38 and 39 are calculated using $\sin \theta_i = i\lambda/\Lambda$ where $\theta_i$ is the angle due to the $i^{th}$ order, $\lambda$ is the wavelength of the femtosecond beam and $\Lambda$ is the mask pitch. For a given propagation distance 37 of the zero order, the corresponding projections d of the pulses 41 and 42 on to the zero order beam 36 will be less than D (37) where $d=D \cos \theta_i$. When D−d is larger than the pulse width 32, the orders have "walked-off" each other and will no longer interfere.

Figure 3B:
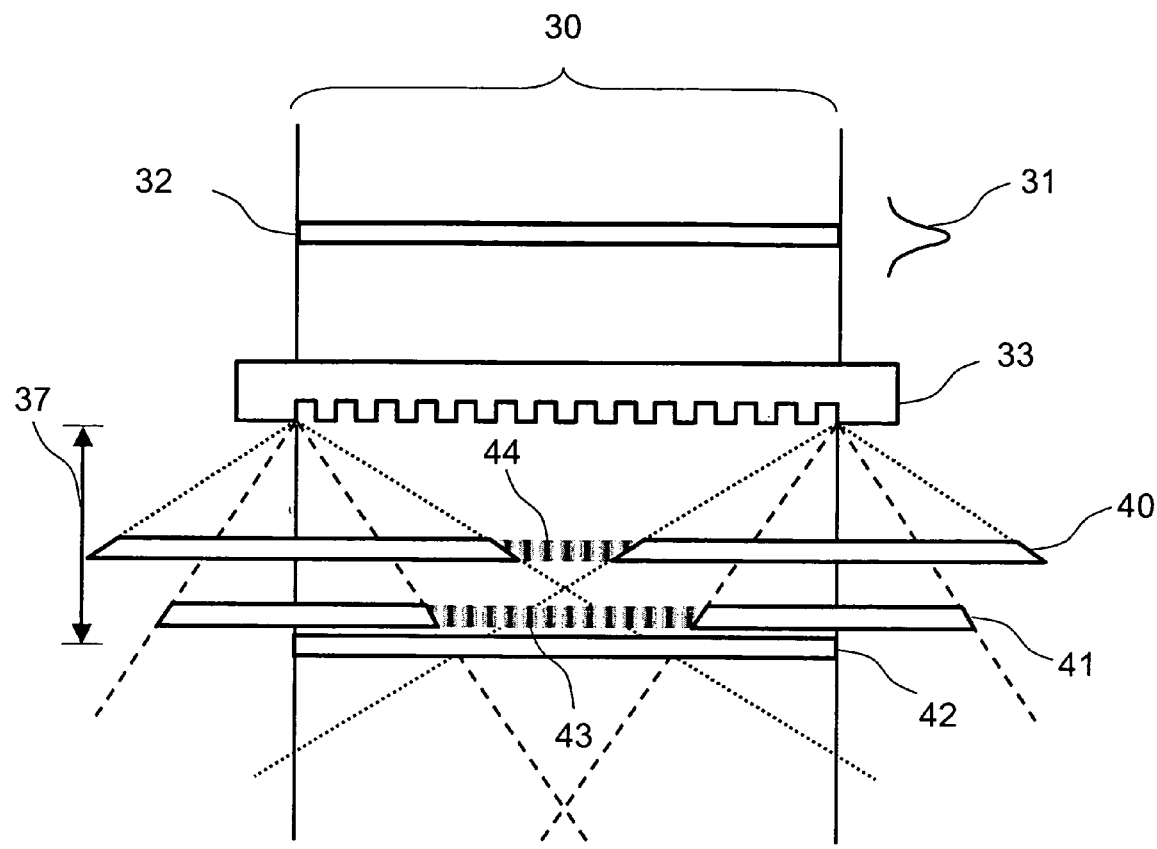
FIG. 3b is a representative view of interference fringes generated by overlapping fs pulse envelopes a given distance from the phase mask

Referring to FIG. 3b, since the time of arrival of the pulses 40, 41, and 42 will be different at distance D (37) from the phase mask, this difference causes a spatial separation of the order pairs due to group velocity walk-off resulting in a pure 2-beam interference pattern rather than multiple beam interference patterns observed near the phase mask. For the time it takes the zero order pulse 42 to propagate the distance 37, the ±1 order pulses 41 will propagate and interfere in region 43. The pitch of the interference pattern is half the pitch of the phase mask. The region where the ±1 orders does not overlap, that is where there is transverse walk-off of the beams, there are no interference pattern generated. Since the femtosecond source has very good spatial coherence any overlap of the ±1 orders will result in a 2-beam interference pattern. A similar effect will occur for the ±2 orders 40 producing an interference fringe pattern 44. Since the index change due to femtosecond irradiation is a threshold multiphoton ionization process, only the order pairs that create an interference fringe patterns with intensities that are above threshold will result in an induced index modulation. If the phase mask has been designed to be zero-order nulled as taught by Hill et al. in U.S. Pat. No. 5,367,588, the majority of the energy is coupled into the ±1 orders (~70%).

Figure 4A:
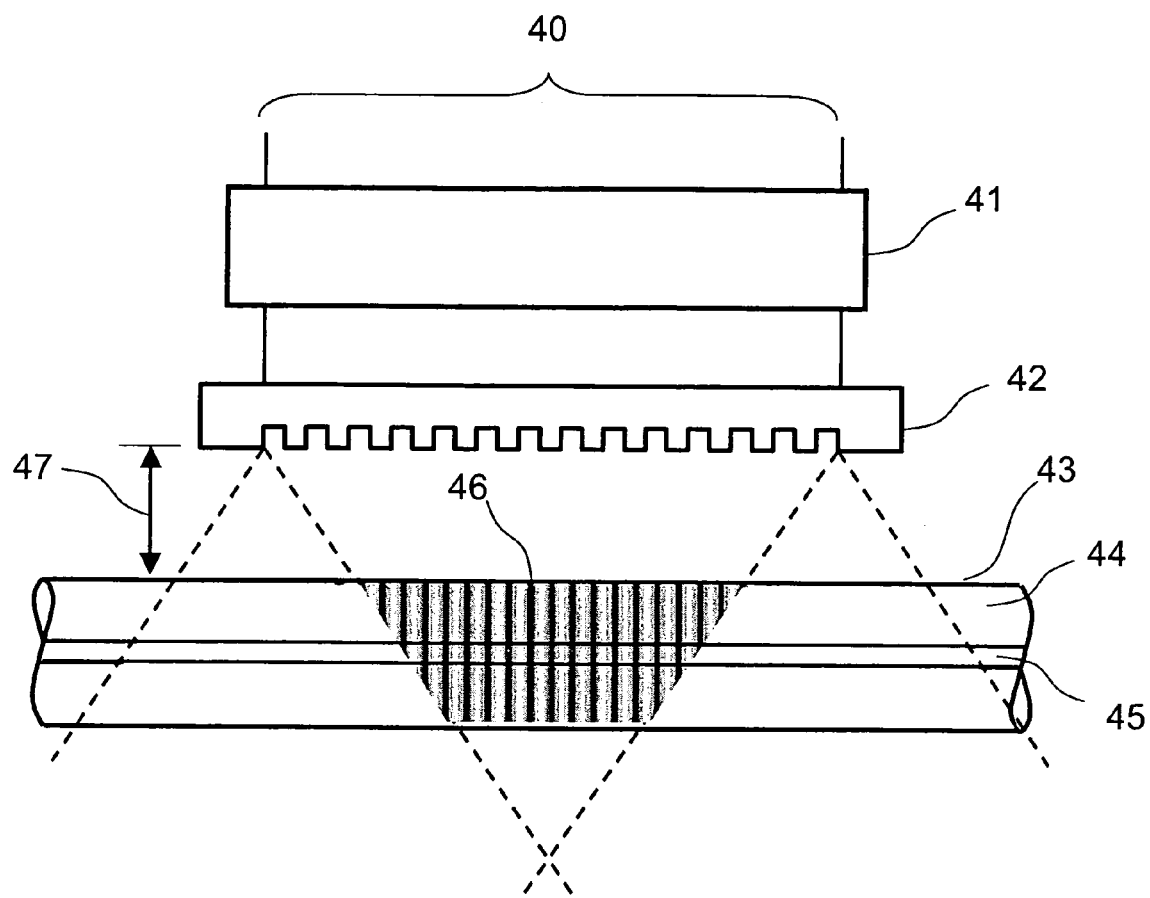
FIG. 4a is a representative top view of an optical fiber being written to using the apparatus of FIG. 2.

Referring to FIG. 4a a top view diagram representative of a fiber receiving a pulse as described with reference to FIG. 2. FIG. 4a includes an optical fiber 43, having a waveguide cladding 44 and a waveguide core 45, which is placed a distance 47 from the phase mask such that the difference in times of arrival of the order pairs due to group velocity walk-off results in a pure 2-beam interference pattern; a diffractive element 42 in the form of a phase mask; and a lens 41. As the ±1 orders propagate through the cross-section of the fiber 43, they will generate the index modulated pattern 46 in both the cladding 44 and core 45 of the optical fiber. {in FIG. 5 we show the experimental results that we have obtained with a 3.213 μm mask.

Figure 4B:
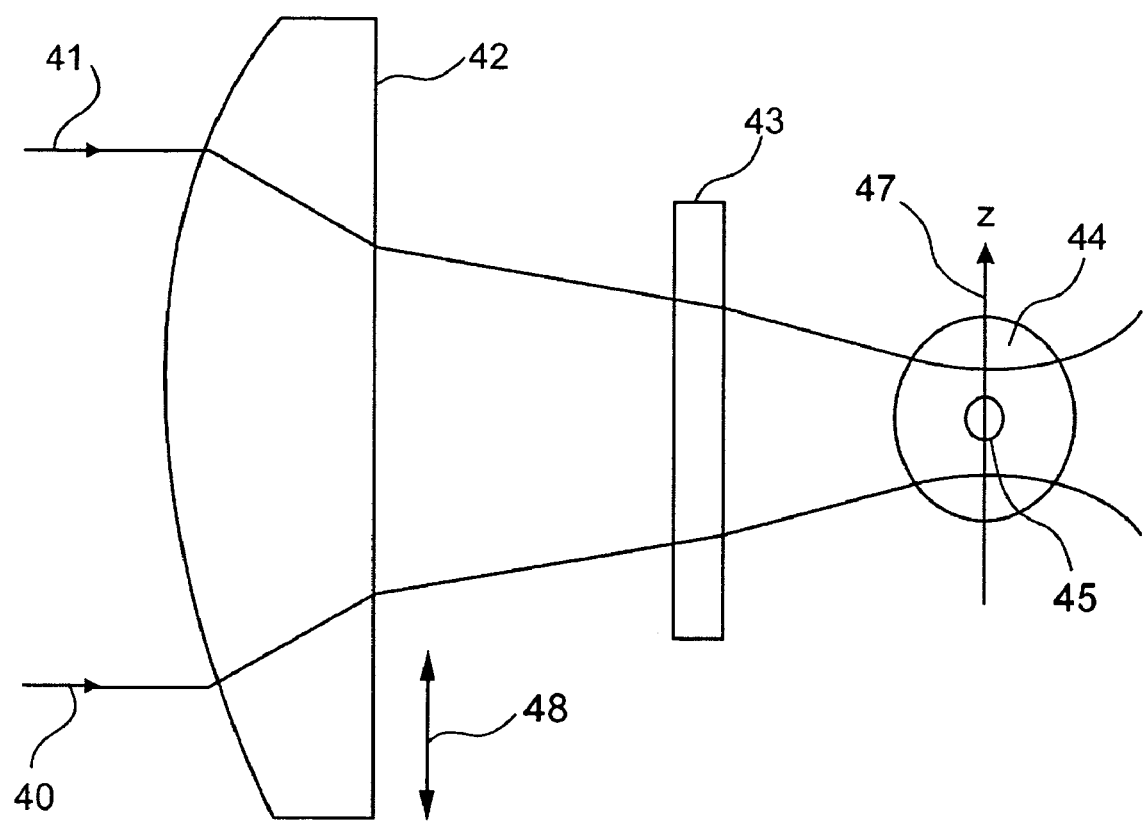
FIG. 4b is a representative side view of an optical fiber being written to using the apparatus of FIG. 2.

Referring to FIG. 4b, a side view of the components presented in FIG. 4a is shown. This diagram includes indications of rays 40 and 41 that are indicative of the extent of an optical pulse. The rays 40 and 41 are shown converging as they approach the diffractive element 43. The separation of the rays 40 and 41 within the diffractive element 43 is shown to be larger than their separation within the waveguide next to the waveguide core 45. Thus, it is apparent that the maximum intensity of the light pulse is proximate or near the waveguide core 45. It should be noted that the rays are nearly symmetric about the axis 47. Tight focusing of the optical pulse will also permit smaller focal spot sizes, less than the waveguide core, which will allow for fabrication for selective exposure of specific regions of the core and cladding. In the preferred embodiment of the invention, the cylindrical lens 42 has a short focal length so that the beam focus is much smaller than the waveguide cladding 44. Considering Gaussian beam optics, the half width of the focal line would be w $\approx \lambda f/\pi w_o$ where $\lambda$ is the wavelength and f is the focal length of the cylindrical lens. For example a cylindrical lens with a 19 mm focal length would have a focal line width of ~4 μm. The corresponding free space Rayleigh range for the focused beam is $z_R = \pi w^2/\lambda$. The beam will remain approximately collimated over twice this length. For the example of the 19 mm focal length cylindrical lens the Rayleigh range is ~15 μm which corresponds to a beam waist ~30 μm in length which is greater than the waveguide core 45 but less than the waveguide cladding 44. By scanning the lens 42 vertically (48), the focal spot generated by the rays 40 and 41 can be swept along the axis 47. In this fashion the induced refractive index modulation can be swept vertically across the cross-section of the fiber 46. In an alternative embodiment, the diffractive element 43 and the optical fiber 46 can be scanned vertically rather than the lens 42.

Figure 5:
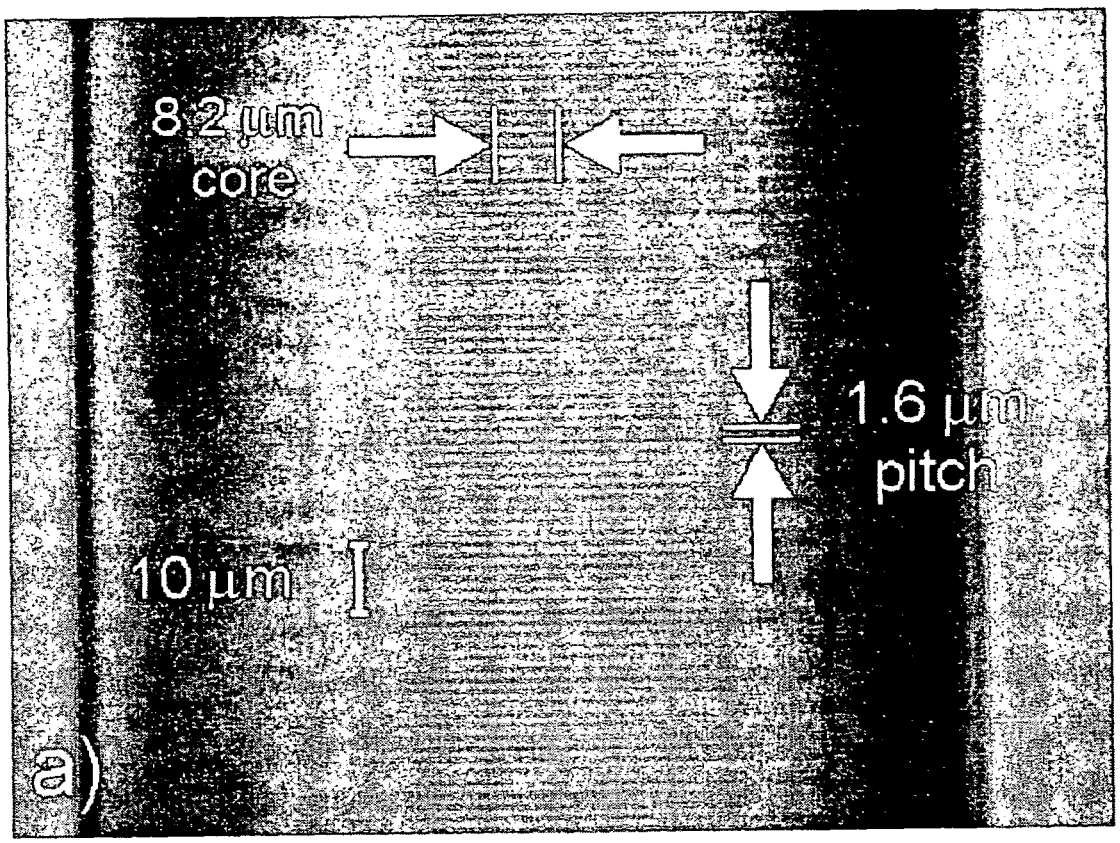
FIG. 5a is an optical microscope image of the index modulation induced in the core and cladding of a standard single mode telecom fiber (SMF-28) using the femtosecond laser and the phase mask. The view is normal to the fs beam plane.
FIG. 5b is an optical microscope image of the index modulation induced in the core and cladding of a standard single mode telecom fiber (SMF-28) using the femtosecond laser and the phase mask that has been rotated 90° with respect to the image in FIG. 5a FIG. 6 is a production system according to an embodiment of the invention.

Optical microscope images of the gratings fabricated in standard non-photosensitized single mode fiber (SMF-28) with a 125 femtosecond pulse duration 800 nm beam, through a 3.213 μm pitch phase mask using the techniques disclosed here are presented in FIG. 5. A distance 47 of 3 mm was used, however the ±1 order walk-off from the zero order occurred at distances>1.3 mm from the mask for a 125 fs pulse.

Figure 5B:
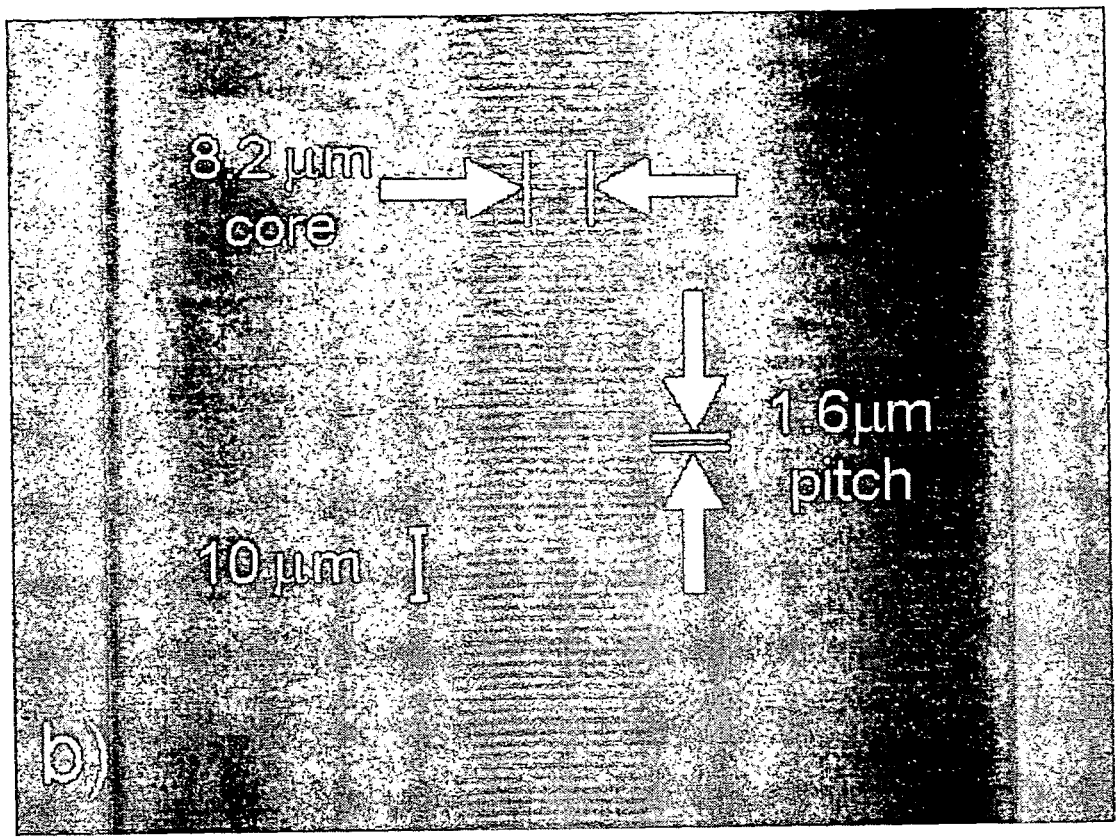

The image of FIG. 5a was taken normal to a plane defined by the femtosecond beam. FIG. 5b was taken with the grating device rotated 90° to FIG. 5a. Since the grating structure is continuous across the core-cladding interface of the optical fiber and penetrates several microns into the cladding layer, good suppression of cladding modes result.

Figure 6:
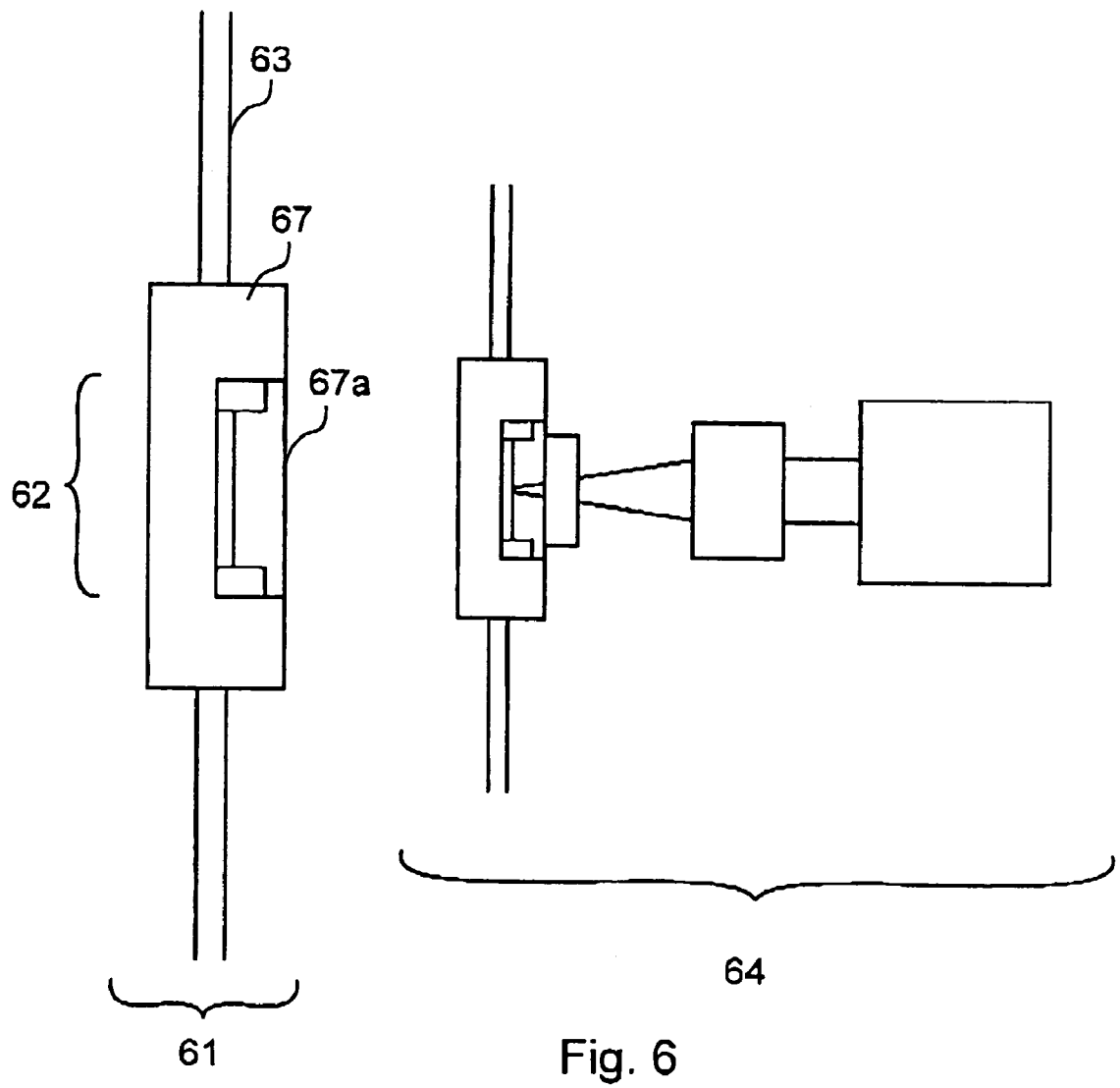
FIG. 6a is the transmission spectrum of the cladding mode suppressed grating that was induced with the femtosecond laser and the phase mask and corresponds to the grating shown in FIG. 5
FIG. 6b is the reflection spectrum of the cladding mode suppressed grating that was induced with the femtosecond laser and the phase mask and corresponds to the grating shown in FIG. 5
FIG. 6c is the cladding mode loss spectrum expressed as difference between the transmission spectrum FIG. 6a and 1-R reflection spectrum FIG. 6b.
Figure 6A:
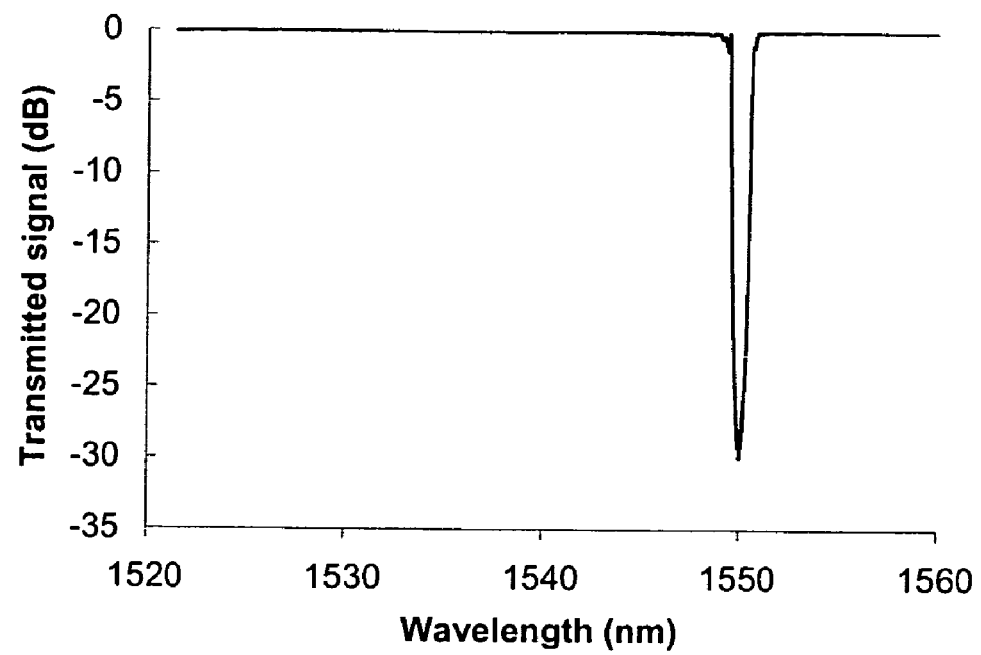
Figure 6B:
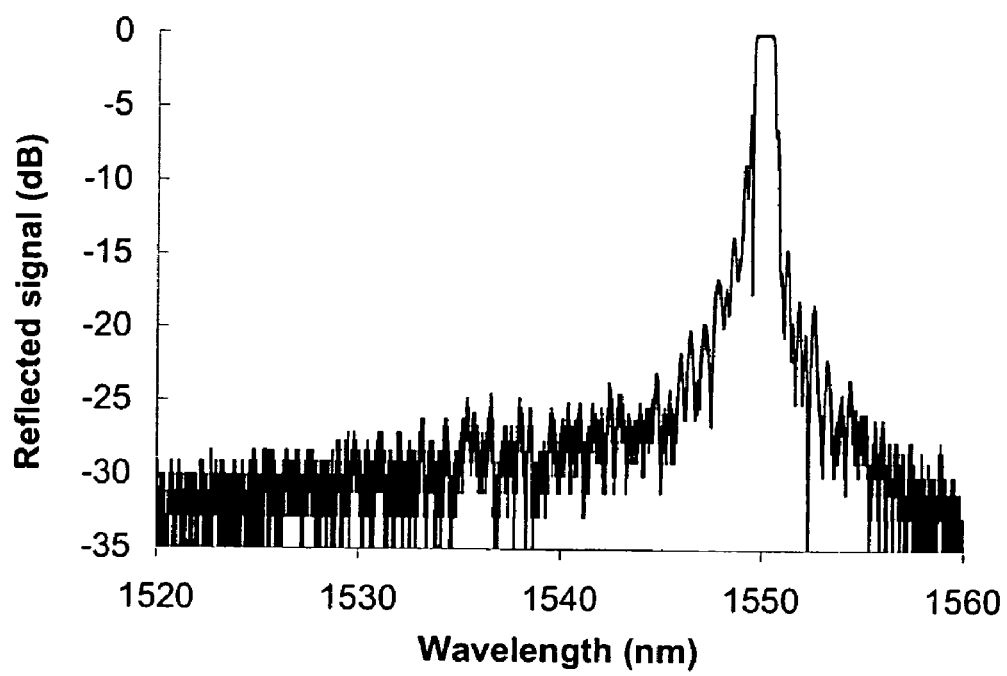
Figure 6C:
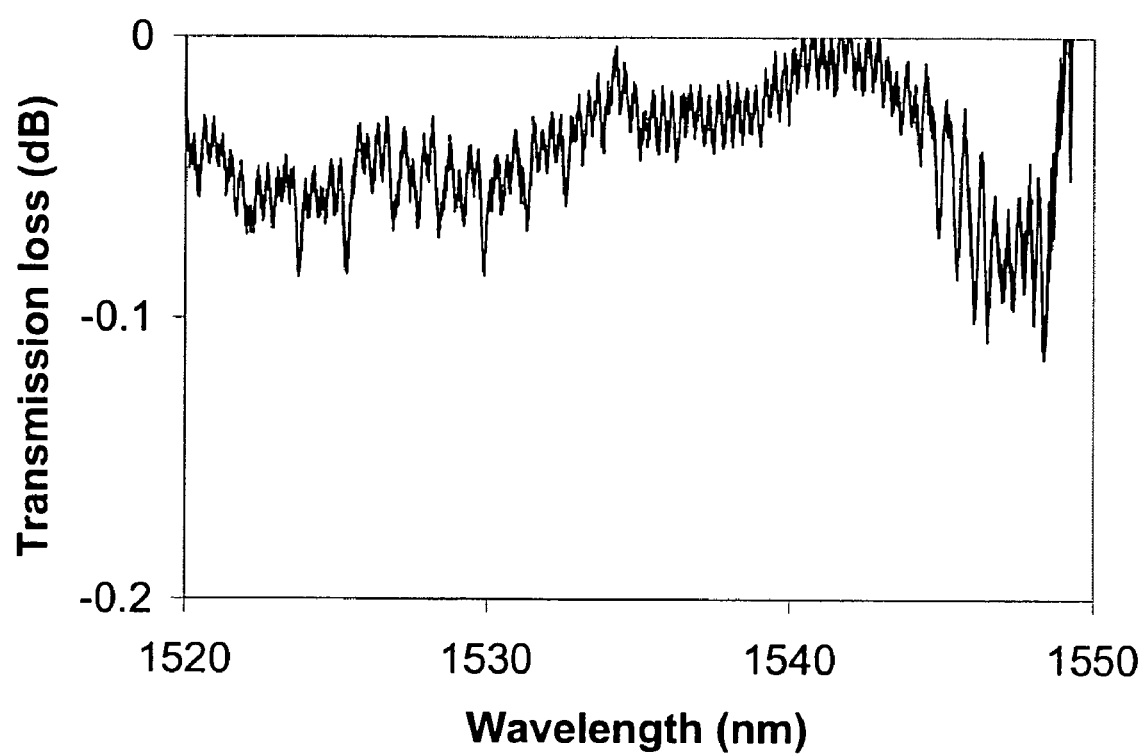

FIG. 6a presents the transmission spectrum of a grating written in standard single mode fiber (SMF-28) with a 125 femtosecond pulse duration 800 nm beam, through a 3.213 μm pitch phase mask. FIG. 6b presents the reflection spectrum of the device, while the transmission loss due to cladding modes is presented FIG. 6c. The spectrum FIG. 6c) is the difference of the short wavelength side of the measured transmission spectrum FIG. 7a) with the transmission inferred from the reflection spectrum FIG. 6b). The grating device presented in FIG. 6a, 6b and 6c displays excellent optical performance and cladding mode suppression. At the Bragg resonance $\lambda_{Bragg}$, the pitch of the grating structure in the fiber $\Lambda$ is defined by $m\lambda_{Bragg} = 2n_{eff}\Lambda$ where m is the order number and $n_{eff}$ is the effective index of the fiber resulting in a third order retro-reflecting grating. The grating device has a −30 dB transmission at $\lambda_{Bragg}$ with cladding mode coupling induced loss is ~0.1 dB (FIG. 7b). The out-of-band insertion loss measured on the long wavelength side of the grating was <0.05 dB.

As a person of skill in the art will be aware, the invention need not be limited to the writing of cladding mode suppressed Bragg gratings within the waveguide core and cladding of an optical fiber. Any application that presently is facilitated by the use of UV-photosensitive cladding fiber can be envisaged without using any special fiber type and the femtosecond laser-phase mask technique disclosed here. For example in some cases it is preferable to provide a tap by writing a grating within the cladding of the optical waveguide without providing a set of interference fringes in the core. In this instance it was found to be advantageous writing the grating at a distance where 3-beam interference occurred by being near to the phase mask, grating planes can be induced at "Talbot" planes that can be on either side of the core without being in the core. Here the 0, ±1 orders would be utilized. Using precision rotation stages, the fiber could then be rotated and reexposed. Alternatively the fabrication of a tilted or blazed grating written in the core and cladding of a fiber could be used to produce doped-fiber amplifier gain equalizing filters. By generating an asymmetry in the photosensitive profile, gratings written only in the cladding region that are not tilted could be used to create cladding modes to produce doped-fiber amplifier gain equalizing filters. Furthermore, long period gratings can be written in standard non-photosensitive telecommunications fiber by the method of this invention.

A person of skill in the art will easily envision the modification of embodiments of the invention for use in a wide variety of applications. There are several different applications and waveguide architectures into which index modulated structures in cores and cladding could be inscribed to produce useful devices. Grating structures could be easily inscribed across the cross-section of tapered optical fibers or waveguides for cladding mode suppression. The technique disclosed here would greatly facilitate the fabrication of these devices, as photosensitization through hydrogen loading would not be required and the grating structure could be impressed across the entire cross section of the taper irrespective of photosensitive doping.

The instant invention can be used for the fabrication of grating assisted fused biconic tapered coupler devices wherein a grating assisted coupler device is written across the entire the fusion region of a fused biconic tapered coupler. The invention obviates the complex costly process of photosensitization through hydrogen loading during photoinscription in photosensitive clad fiber that has been made into a fused biconic tapered coupler.

A person of skill in the art will easily envision the modification of embodiments of the invention for use in a wide variety of applications. For example, the invention is equally applicable to planar waveguide structures and buried waveguide structures.

Clearly, the use of a higher order phase mask permits more variation in the physical positioning of the target waveguide when it receives a diffracted pulse. Referring to FIG. 6, a production system for producing FBGs according to another embodiment of the invention is shown. This embodiment of the invention is specifically intended to take advantage of the reduced tolerances of a system according to the invention. In a first stage 61 of the system 60, a portion 62 of an optical fiber 63 is stripped, exposing the cladding. The stripped portion 62 is disposed in a package 67. The package includes a transparent portion 67a. In a second stage 64, the stripped portion 62 is brought into close proximity with a diffractive optical element. The diffractive optical element receives a femtosecond pulse of laser light. The femtosecond pulse is diffracted and propagates through the transparent portion 67a and forms an interference pattern within stripped portion 62 of the optical fiber 63. The intensity peaks of the interference pattern are sufficiently intense to cause a permanent change in the index of refraction in the optical fiber 63. This production method is highly advantageous because it helps to protect the exposed optical fiber during processing. Additionally, it provides flexibility in that the first stage 61 is optionally performed at a first location while the second stage 65 is performed at a second location. Optionally, an opaque covering, such as paint, is applied to the transparent portion 67a.

Figure 7:
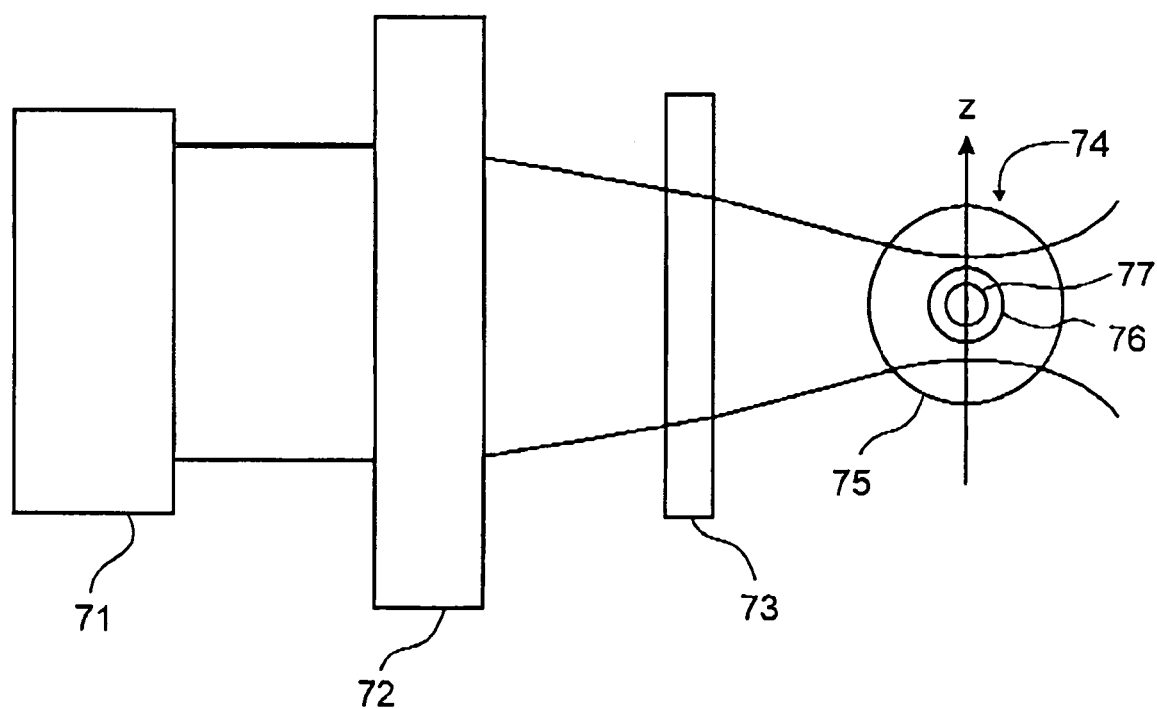
FIG. 7 is a diagram of a system according to an embodiment of the invention for writing gratings through a jacket of a waveguide; and, FIG. 8 is a diagram of a system according to an embodiment of the invention featuring a precision alignment stage.

Referring to FIG. 7, an apparatus for writing a Bragg grating into an optical fiber according to an embodiment of the invention is shown. The apparatus comprises a femtosecond laser source 71, a lens 72, a diffraction element 73, and a target waveguide 74. The target waveguide 74 includes a jacket 75, a cladding 76 and a waveguide core 77. The femtosecond laser source 71 provides pulses of laser light having a predetermined range of wavelengths. The material of the jacket 75 is transparent to this predetermined range of wavelengths. In use, the femtosecond laser source 71 provides a pulse of laser light. The pulse of laser light propagates to the lens 72 that focuses the pulse of laser light. The pulse of laser light is incident a surface of the diffractive element 73. A portion of the pulse laser light propagates to the target waveguide 74 and is incident thereon. Since the jacket 75 is transparent to the range of wavelengths of the femtosecond laser source 71 the portion of the pulse of laser light penetrates the jacket 75 and forms an interference fringe pattern in the waveguide core 77. The intensity of the peaks of the interference fringe pattern is sufficient to cause a change in the index of refraction of the waveguide core 77. Thereby forming a Bragg grating. There are prior-art examples of fabrication of UV-induced fiber gratings where special polymer jackets are used that are transmissive to the UV-light. Aspell et al in U.S. Pat. No. 5,620,495 disclose a method of fabrication of UV-induced fiber Bragg gratings through a single UV-transmissive polymer coating while Starodubov in U.S. Pat. No. 6,222,973 teaches a similar method of UV-induced grating fabrication but with optical fiber being protected by a multi-layer polymer coating. In this embodiment of the invention no special polymer coating is required and standard coatings with are transmissive to the infrared radiation are used.

Figure 8:
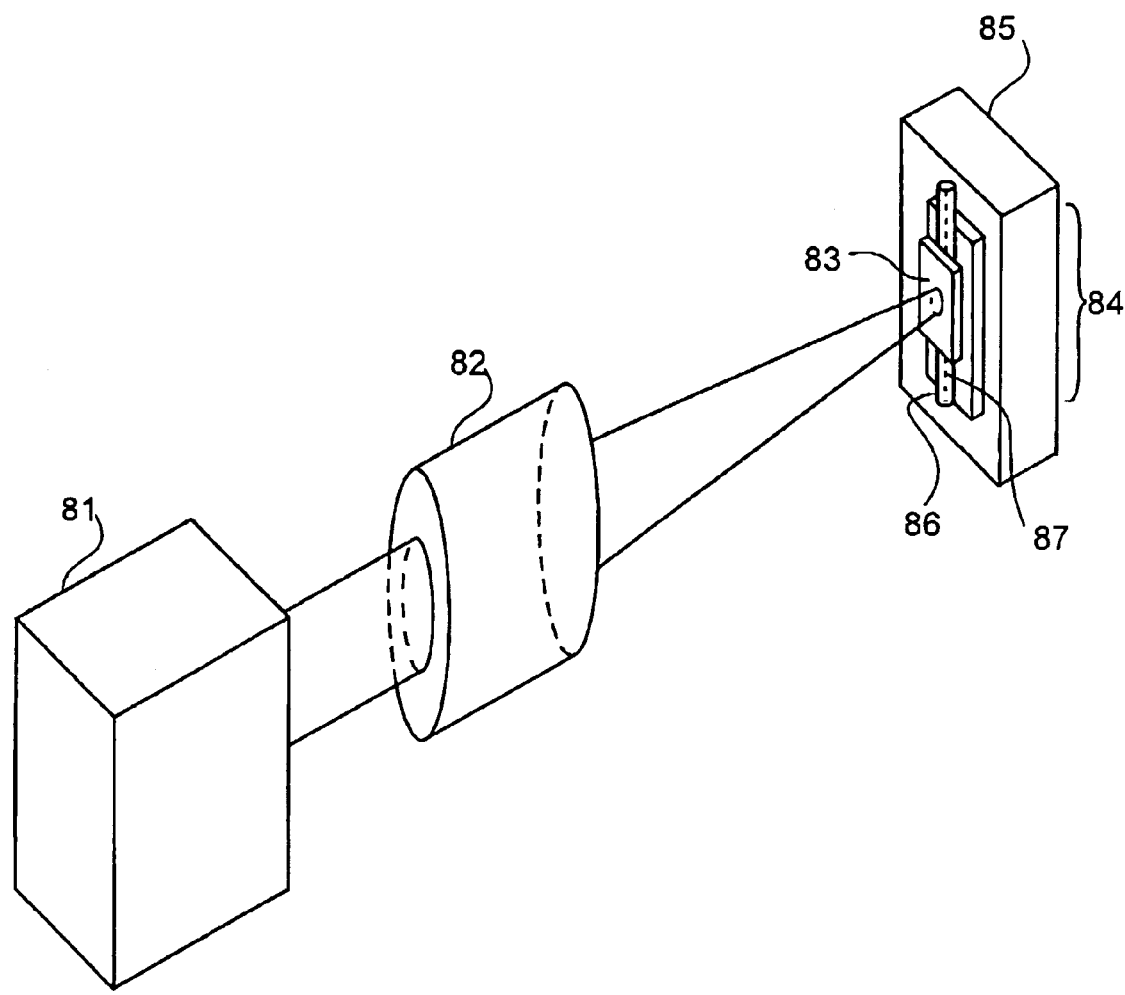

Referring to FIG. 8, another embodiment of the invention is shown. This embodiment comprises a femtosecond laser source 81, a lens 82, an phase mask 83, a target waveguide 84, and an alignment stage 85 supporting precision alignment. The target waveguide 84 includes a waveguide core 86 and a waveguide cladding 87. In use, the femtosecond laser source 81 provides a pulse of laser light. The pulse of laser light propagates to the lens 82 that focuses the pulse of laser light. The focused pulse of laser light is incident a surface of the phase mask 83. A portion of the pulse propagates to the target waveguide 84 and is incident thereon. The portion of the pulse forms an interference fringe pattern in the target waveguide 84. The intensity of the peaks of the interference fringe pattern is sufficient to cause a change in the index of refraction of the target waveguide 84. The alignment stage 85 is sufficiently precise to vary the location of the interference fringe pattern by setting the alignment stage 85 prior to producing pulses from the femtosecond laser source 81. Thus, in a first mode of operation a set of fringes corresponding to an interference fringe pattern is written into the waveguide core 86 and the waveguide cladding 87 of the target waveguide 84. In a second mode of operation a set of fringes is written to the waveguide cladding 87 absent writing fringes to the waveguide core 86. In a third mode of operation, the alignment stage provides an angle between the phase mask 83 and the waveguide core 86 thereby producing a grating that is blazed. In a fourth mode of operation, the focused pulse of laser light is incident a surface of the phase mask 83. A portion of the pulse propagates to the target waveguide 84 and is incident thereon. The portion of the pulse does not form an interference fringe pattern in the target waveguide 84 but instead produces an intensity modulation based on the binary output from the phase mask.

The embodiment of the invention described with reference to FIG. 8 is also highly beneficial because it supports a "step and repeat" production process. The step and repeat production process is useful in the production of very long fiber gratings. Such gratings are commonly used in wavelength dispersion compensation systems used in DWDM optical networks. The step and repeat production process is also useful for producing localized grating structures along a length of the fiber, such as sampled gratings. Other suitable applications will be apparent to one of skill in the art. A person of skill in the art will be aware that other embodiments of the invention such as, for example, the embodiment described with reference to FIG. 5 will also support a step and repeat process.

Due to the rapid but short-lived multi-photon ionization process, very high index variations are possible without prior sensitization of the fibers or waveguides with, for example, hydrogen or deuterium. In addition, the highly localized index changes produced by the interference fringes from the phase mask are similar to single shot UV-induced damage gratings in that the refractive index change is permanent up to the glass transition temperature of the fiber. Thus, in a process according to the invention, high spectral quality gratings with very high index modulations are easily produced. Beneficially, these gratings are also robust at high temperatures. These advantages make such a process particularly well suited to high volume manufacturing as it reduces the need for additional processing steps. Additionally, since the index changes produced are relatively high a very high quality Bragg grating is produced.

A wide variety of alternative embodiments of the invention are easily envisioned by a person of skill in the art. For example, other embodiments of the invention feature an amplitude mask instead of a diffractive optical element. If the amplitude mask is provided sufficiently close to the target waveguide then a grating is produced absent diffraction of the electromagnetic radiation.

Instead of using a phase mask to inscribe pure 2-beam interference patterns selectively in the core and cladding of waveguide, a holographic technique of inducing a refractive index change in materials could be used to selectively induce index changes in the core and cladding of optical fibers and waveguides as disclosed herein.

Of course the grating can be a single contiguous uniform grating that spans the core and substantially most or all of the cladding or, alternatively the grating can be comprised of two gratings having same or similar characteristics or wherein the gratings have different characteristics, such as a different index modulation, position or pitch from the cladding region.

Within this specification, actinic radiation is to be understood to be radiation that causes a chemical photorefractive index change in an optical material as opposed to a physical process that appears to cause the refractive index change in the materials not due to the dopant dependant mechanisms occurring with UV-induced index change, namely color center formation. In accordance with this invention, the predominant refractive index change is due to the creation of free electrons through non-linear absorption and multi-photon ionization of bound charges; this may be followed by avalanche ionization and localized dielectric breakdown as these free electrons are accelerated by the intense but short time duration laser field. This leads to a localized melting and restructuring of the material and a concurrent increase in the index of refraction.

Numerous other embodiments of the invention will be apparent to one of skill in the art without departing from the spirit and scope of the invention. For example, a person of skill in the art will be aware that the technique according to the invention is optionally combined with the teachings of Miura et al. in U.S. Pat. No. 5,978,538, and Dugan et al. in U.S. Pat. No. 6,628,877. Miura et al. teach the writing of waveguide in bulk glasses while Dugan et al. teach the modification or trimming of existing waveguide structures with ultrafast radiation. Specifically, the techniques taught by the invention, and the techniques of Miura et al. are optionally combined to provide a Bragg grating in a photosensitive material. For example, it is known to use sapphire fiber for high power beam delivery in industrial and medical applications. Typically the fibers are multimode with core diameters no smaller than 150 microns. Since this fiber is typically a single crystal, it is extremely difficult to draw it down to a 5 micron diameter where it would act as a single mode fiber. Since the sapphire fiber has a very high glass transition temperature (2000° C.) it has sometimes been used for high temperature sensing applications. Using a phase mask according to the techniques described with reference to the invention in combination with the method of Miura et al, a refractive index induced core is optionally written in the center and along the length of the sapphire fiber. The resulting device provides a high temperature stress-temperature sensor based on retro-reflecting Bragg gratings. There are similar fiber grating sensors in standard fiber that are used at lower temperatures in the oil and gas industry. This new sensor is optionally incorporated into smart skin structures that are exposed to high temperatures, for example the Space Shuttle.

What is claimed is:

1. A method for inducing a spatially modulated refractive index pattern in an at least partially light transmissive or absorbing material, comprising the steps of:

providing the at least partially light transmissive or absorbing material;

disposing a mask to be used as an interferometer, adjacent to the partially light transmissive or absorbing material; and, irradiating surface of the mask with electromagnetic radiation having a predetermined wavelength range and having a pulse duration of less than or equal to 100 picoseconds, wherein the mask is disposed to permit a portion of the electromagnetic radiation to interact with the mask and be incident on the at least partially light transmissive or absorbing material, the interaction of the electromagnetic radiation with the mask for producing a plurality of diffracted orders greater than two, wherein at least one of the diffracted orders is a pair, the interaction of the electromagnetic radiation with the mask for producing a spatial intensity modulation pattern within the at least partially light transmissive or absorbing material, the electromagnetic radiation incident on the at least partially light transmissive or absorbing material being sufficiently intense to cause a change in an index of refraction of the at least partially light transmissive or absorbing material, wherein electromagnetic radiation interacting with the surface of the mask has a sufficiently low intensity to not significantly alter produced spatial intensity modulation properties of the mask, wherein the step of disposing a mask to be used as an interferometer includes the steps of disposing and orienting the mask adjacent to the at least partially transmissive material at at least a distance "d" such that group velocity walk-off results in pure two-beam interference within the at least partially transmissive or absorbing material wherein the distance "d" is chosen such that the difference in times of arrival of the order pairs due to group velocity walk-off results in the pure two-beam interference pattern of sub-beams of said pulse of light that have passed through or reflected off of the mask.

2. A method of inducing a spatially modulated refractive index pattern as defined in claim 1 wherein the at least partially light transmissive or absorbing material is a cladding of an optical waveguide.

3. A method as defined in claim 2 wherein the spatially modulated refractive index pattern is a grating and wherein a grating is also written in a core of the optical waveguide.

4. A method as defined in claim 3 wherein the grating in the core and the grating in the cladding is contiguous and extends across a boundary between the cladding and the core along a cross-section of the waveguide.

5. A method, as defined in claim 4, wherein the grating extending through a cross section of the core and the cladding is substantially uniform, said grating for reflecting a component of light propagating through said core having a predetermined wavelength.

6. A method according to claim 5, wherein the waveguide is a SMF-28 optical fiber.

7. A method according to claim 3 wherein the grating structure in the core and cladding is larger than the cross-section of the fundamental guided mode where the coupling coefficient between core and cladding modes is near zero.

8. A method according to claim 3 where the optical waveguide is an optical fiber, wherein the grating structure in the core and cladding is larger than the cross-section of the $LP_{01}$ guided mode where the coupling coefficient $\kappa_{01,\mu\nu}$ between core and cladding modes is near zero.

9. A method as defined in claim 2 where the cladding comprises more than one cladding region.

10. A method according to claim 2 where said cladding is not photosensitive to actinic UV radiation.

11. A method, as defined in claim 1 for inducing a spatially modulated refractive index pattern in an at least partially light transmissive or absorbing material wherein said material is an optical waveguide having a cladding and a core and wherein the modulated refractive index pattern is a blazed grating.

12. A method according to claim 1 where said at least partially transmissive or absorbing material is a fused biconic tapered coupler and wherein the modulated refractive index pattern is in a fusion region of the said fused biconic tapered coupler.

13. A method according to claim 1 wherein the at least partially transmissive or absorbing material is a tapered optical fiber.

14. A method according to claim 1, wherein the at least partially transmissive or absorbing material is an optical waveguide having a core and a cladding.

15. A method according to claim 1, comprising the step of providing a laser source and a focusing element, the laser source for providing the electromagnetic radiation, wherein the focusing element focuses electromagnetic radiation provided by the laser source to a region near a surface of the at least partially transmissive or absorbing material such that said electromagnetic radiation does not significantly alter the spatial intensity modulation properties of the mask.

16. A method according to claim 15, wherein the focusing element is optically disposed between the laser source and the mask.

17. A method as defined in claim 1 wherein during the step of providing electromagnetic radiation, the at least partially transmissive or absorbing material and the beam are relatively moved so as to extend the grating.

18. A method as defined in claim 1 wherein the at least partially light transmissive or absorbing material is a crystal.

19. A method according to claim 1, wherein the at least partially light transmissive or absorbing material is a sapphire optical fiber, the sapphire optical fiber having an induced refractive index change for providing a single-mode core, the single-mode core for propagating electromagnetic radiation at a design wavelength.

20. A method as in claim 1 wherein the mask is a phase mask.

21. A method of inducing a spatially modulated refractive index pattern as defined in claim 1 wherein the at least partially light transmissive or absorbing material is a core of an optical waveguide and wherein the step of the mask is disposed to permit a portion of the electromagnetic radiation to interact with the mask and be incident on the core, the interaction of the electromagnetic radiation with the mask for producing a spatial intensity modulation pattern within the core, the electromagnetic radiation incident on the core being sufficiently intense to cause a change in an index of refraction of the core, the electromagnetic radiation interacting with the surface of the mask having a sufficiently low intensity to not significantly alter produced spatial intensity modulation properties of the mask.

22. An optical waveguide according to claim 21 where said core is not photosensitive to actinic UV radiation.

23. A method for inducing a spatially modulated refractive index pattern in an at least partially light transmissive or absorbing material, comprising the steps of:
providing the at least partially light transmissive or absorbing material;
disposing a mask to be used as an interferometer, adjacent to the partially light transmissive or absorbing material; and,
irradiating surface of the mask with electromagnetic radiation having a predetermined wavelength range and having a pulse duration of less than or equal to 500 picoseconds, wherein the mask is disposed to permit a portion of the electromagnetic radiation to interact with the mask and be incident on the at least partially light transmissive or absorbing material, the interaction of the electromagnetic with the mask for producing a plurality of diffracted orders, the diffracted orders generated in pairs, the interaction of the electromagnetic radiation with the mask for producing a spatial intensity modulation pattern within the at least partially light transmissive or absorbing material, the electromagnetic radiation incident on the at least partially light trans missive or absorbing material being sufficiently intense to cause a change in an index of refraction of the at least partially light transmissive or absorbing material, wherein electromagnetic radiation interacting with the surface of the mask has a sufficiently low intensity to not significantly alter produced spatial intensity modulation properties of the mask, wherein the at least partially light transmissive or absorbing material is an optical fiber and wherein the optical fiber comprises an external jacket layer and wherein the electromagnetic radiation is infrared radiation and wherein in the step of providing electromagnetic radiation, a portion of the electromagnetic radiation propagates from the diffractive optical element through the external jacket layer and into the fiber cladding and/or core.

* * * * *